US011755030B2

(12) United States Patent
Ouyang

(10) Patent No.: US 11,755,030 B2
(45) Date of Patent: Sep. 12, 2023

(54) MAPPING AND TRACKING SYSTEM FOR ROBOTS

(71) Applicant: Chien Ouyang, Pleasanton, CA (US)

(72) Inventor: Chien Ouyang, Pleasanton, CA (US)

( * ) Notice: Subject to any disclaimer, the term of this patent is extended or adjusted under 35 U.S.C. 154(b) by 304 days.

(21) Appl. No.: 17/134,105

(22) Filed: Dec. 24, 2020

(65) Prior Publication Data

US 2021/0116933 A1 Apr. 22, 2021

Related U.S. Application Data

(63) Continuation of application No. 16/130,212, filed on Sep. 13, 2018, now Pat. No. 11,048,268, which is a continuation-in-part of application No. 15/256,374, filed on Sep. 2, 2016, now Pat. No. 10,098,277.

(51) Int. Cl.
*G05D 1/02* (2020.01)
*G01S 15/08* (2006.01)
*G01S 5/30* (2006.01)
*G01S 11/16* (2006.01)

(52) U.S. Cl.
CPC .............. *G05D 1/0255* (2013.01); *G01S 5/30* (2013.01); *G01S 15/08* (2013.01); *G05D 1/0212* (2013.01); *G05D 1/0229* (2013.01); *G05D 1/0246* (2013.01); *G01S 11/16* (2013.01); *G05D 2201/0203* (2013.01); *G05D 2201/0208* (2013.01)

(58) Field of Classification Search
CPC ... G05D 2201/0203; G05D 2201/0208; G05D 1/0212; G05D 1/0229; G05D 1/0246; G05D 1/0255; G01S 5/30; G01S 15/08; G01S 11/16; E04H 4/1654

USPC .......................................................... 701/23
See application file for complete search history.

(56) References Cited

U.S. PATENT DOCUMENTS 8,018,792 B2 * 9/2011 Kyun ..................... B25J 13/089
367/11
8,577,538 B2 * 11/2013 Lenser ................. G05D 1/0027
701/28

(Continued)

FOREIGN PATENT DOCUMENTS

| EP | 3232762 B1 * | 11/2022 | ........... A01D 34/008 |
| WO | WO-2007109627 A2 * | 9/2007 | ........... A01D 34/008 |
| WO | WO-2016103068 A1 * | 6/2016 | ........... A01B 69/008 |

*Primary Examiner* — Atul Trivedi
(74) *Attorney, Agent, or Firm* — Leon E. Jew; Lin Kong; DAHYEE LAW GROUP

(57) ABSTRACT

A robotic mapping and tracking system including a robot and boundary posts are disclosed. The robot includes an ultrasonic transmitter, a processor and a camera component. The boundary posts are configured to be placed adjacent to a boundary of a working region. Each boundary post of the plurality of boundary posts includes an ultrasonic receiver. Time-of-flights of the ultrasonic waves are measured to identify distances in between the robot and boundary posts. The camera component of the robot captures an image of an environment of the robot. The processor of the robot analyzes the image of the environment and identifies at least a portion of the working region in front of the robot from the image. The processor of the robot determines a moving route based on the identified portion of the working region in front of the robot and the distances in between the robot and the boundary posts.

27 Claims, 23 Drawing Sheets

(56) References Cited

U.S. PATENT DOCUMENTS

| | | | | |
|---|---|---|---|---|
| 8,868,237 B2* | 10/2014 | Sandin | ............... | A01D 34/008 |
| | | | | 700/258 |
| 9,329,598 B2* | 5/2016 | Pack | ..................... | G06T 7/73 |
| 11,037,320 B1* | 6/2021 | Ebrahimi Afrouzi | ..... | G06T 7/90 |
| 11,069,082 B1* | 7/2021 | Ebrahimi Afrouzi | ... | G06T 7/521 |
| 2002/0153184 A1* | 10/2002 | Song | .................. | G05D 1/0282 |
| | | | | 180/167 |
| 2010/0179691 A1* | 7/2010 | Gal | ......................... | F41H 7/03 |
| | | | | 700/259 |
| 2012/0290165 A1* | 11/2012 | Ouyang | .............. | A01D 34/008 |
| | | | | 701/25 |
| 2013/0041526 A1* | 2/2013 | Ouyang | .............. | A01D 34/008 |
| | | | | 701/2 |
| 2015/0202770 A1* | 7/2015 | Patron | ............... | G06Q 30/0265 |
| | | | | 901/50 |
| 2015/0366129 A1* | 12/2015 | Borinato | ............ | G05D 1/0278 |
| | | | | 701/25 |
| 2016/0016312 A1* | 1/2016 | Lawrence, III | ........ | B25J 9/1697 |
| | | | | 901/41 |
| 2016/0100522 A1* | 4/2016 | Yamauchi | ............ | G05D 1/0212 |
| | | | | 701/25 |
| 2016/0165795 A1* | 6/2016 | Balutis | ................. | G05D 1/0044 |
| | | | | 701/25 |
| 2021/0018929 A1* | 1/2021 | Choi | ................... | G05D 1/0274 |

* cited by examiner

MAPPING AND TRACKING SYSTEM FOR ROBOTS

CROSS REFERENCE TO RELATED APPLICATION

This application is a continuation of U.S. application Ser. No. 16/130,212, filed Sep. 13, 2018, which is a continuation-in-part of U.S. application Ser. No. 15/256,374, filed Sep. 2, 2016 and the U.S. application Ser. No. 15/256,374 is a continuation-in-part of U.S. application Ser. No. 13/572, 601, filed Aug. 10, 2012, which claims the benefit and priority of U.S. Provisional Application No. 61/574,866, filed Aug. 11, 2011. The contents of the above-identified applications are incorporated herein by reference in their entirety.

BACKGROUND OF THE INVENTION

1. Field of the Invention

The present invention relates to a local mapping and tracking system for robots.

2. Background

People use robots to do all kinds of works to save time, money, and energy, and also for accuracy, speed, convenience, and safety reasons, especially for those things when human are not capable of doing. A robotic floor vacuum cleans the indoor of house, a robotic lawn mower is used to cut the lawn grass, and a robotic pool cleaner cleans the pool. Users may set the operation times and frequencies of robots according to their schedules and needs. In general, the robots are operated at a local region enclosed by a boundary. The region may be confined or not confined. For the indoor floor cleaning robot, the region is the indoor floor, and the region is confined by the house walls. For a pool cleaning robot, the pool is the region. For the robotic lawn mower, the region is the lawn area, and the lawn area is typically not confined unless there is a fence or other things enclosing or confining the lawn. However, even the lawn is not confined, the region still has a boundary, and the boundary is the border separating the grass area from non-grass area.

For the operation of robots, one important application factor is to know the boundary of the working region such that the robot travels only inside the boundary to do the works. For a human to do the floor cleaning, pool cleaning, or yard work, the person may come out an idea or a plan to do the work according to his or her preferences. The plan may be clearly defined or not clearly defined but it is within the person's control. The person may keep changing the ideas or plans, but basically the person knows where is he or she located in the house or at the yard, and the person determines whatever he or she wants to do at any moments. A human person, with the views from the eyes, has the capability to determine the rough geometry or the map of the working region, and to approximate the person's position inside the working region. The capability is basically doing two things: the mapping and the tracking. The mapping identifies the configuration or the geometry of the working region, or identifies the outer boundary of the working region. The tracking identifies the person's position inside the working region, as the person keeps moving and working at any instants. A human determines easily if a certain area inside the working region has been visited or not, so as not to repeat or miss the works at that certain area.

The logics of mapping and tracking seem very simple and straight forward for a human, however, from a perspective of robotic control, is very complex, because the microcontrollers or microchips on the robots are still no way comparable to a human's brain. A robot may be embedded with a super computer to function and to do the works like a human, but the cost will be not practical for most generic daily works in real robotic applications.

This disclosure proposes an economic local mapping and tracking system for robot such that the robot determines the geometry of the working region, and determines the relative positions in between the robot and the boundary of the working region. In such a manner, the working region is mapped and the moving of robot is tracked, monitored, and controlled.

SUMMARY OF THE INVENTION

This application discloses a local mapping and tracking system for robots. The system includes a robot and a plurality of boundary posts. The RF transceivers and ultrasonic sensors are placed on the robot and on the boundary posts. The boundary posts here refer to the extruded entities to be placed near the boundary of the working region to accommodate the RF transceivers and ultrasonic sensors, and they are used to guide the moving of the robot.

An ultrasonic transmitter is placed on the robot, and the ultrasonic receivers are placed on the boundary posts. The RF transceivers are placed on both the robot and on the boundary posts. The RF transceivers can either transmit or receive RF signals. The ultrasonic transmitter on the robot transmits an ultrasonic wave signal toward the boundary posts, and the ultrasonic receivers on the boundary posts receive the ultrasonic waves from the robot. An RF transceiver on the robot or on the boundary posts may be used to synchronize the clock times of the robot and the boundary posts. The RF transceivers are also used to transmit the data, and the transmitted data may be the distance, the clock times, the boundary post ID, and the direction of sound waves.

This application further discloses a camera system to do the tracking and mapping for robot to work inside the working region. The system includes a robot and a camera. The camera takes the images or videos of the regions to determine the position of the robot with respect to the boundary of the working region. The geometry and contour of the working region may be determined with the camera's imaging system, such that, the robot use the image data to determine a moving route, a moving direction, and a moving distance.

At least some embodiments of the present invention provide a mapping and tracking system such that the robot maps of the working region and determines the position of the robot inside the working region. In such a manner, users define a moving route for the robot.

In one embodiment, the local mapping and tracking system contains a robot and a plurality of boundary posts.

In one embodiment, the local mapping and tracking system contains a robot and a camera on the robot.

In one embodiment, the robot contains an ultrasonic transmitter and a RF transceiver.

In one embodiment, the boundary posts are placed on the ground along the border of the working region to define the outer boundary of the region.

In one embodiment, each boundary post contains a RF transceiver and at least one ultrasonic receiver.

In one embodiment, the ultrasonic transmitter on the robot broadcasts ultrasonic waves toward boundary posts, and the ultrasonic receivers on the boundary posts receive the ultrasonic waves from the robot.

In one embodiment, the relative distances between the robot and the boundary posts are determined by the time-of-flights of ultrasonic waves.

In one embodiment, one of the RF transceivers, either on the robot or on one of the boundary posts, is used to synchronize the clock times of the robot and the boundary posts.

In one embodiment, the RF transceivers on the boundary posts transmit the data of the distance, the post ID, and the detected sound wave directions to the robot.

In one embodiment, the boundary posts may be placed at the interior of the working region to guide the moving of the robot.

In one embodiment, the ultrasonic receivers on the boundary posts determine the incoming sound wave direction to identify the relative angles and directions of the robot and the boundary posts.

In one embodiment, each ultrasonic receiver has a receiving angle to receive the sound wave from the robot from a specific direction.

In one embodiment, one or more than one ultrasonic receiver may receive the sound wave from the robot at the same time.

In one embodiment, the position of the robot may be pinpointed with the determinations of incoming sound wave directions of ultrasonic receivers on the boundary posts.

In one embodiment, the exact position of the robot, with respect to boundary posts, is determined with the known incoming sound wave directions, relative distances in between the robot and the boundary posts, and the robot's the traveling distances.

In one embodiment, a boundary line sensor, such as a camera, is placed on the robot to determine the working and non-working areas.

In one embodiment, each boundary post contains a circuit to amplify and process the sound wave.

In one embodiment, the robot uses the images or videos to differentiate the working region and non-working region, and to determine a moving route.

In one embodiment, the boundary post system and camera system may be coupled together to determine robot's moving route.

In one embodiment, robot uses the global distance data, local distance data, global image data, and local image data to determine a moving route.

In one embodiment, robot collects image data, learns from the image data, to determine a moving route.

BRIEF DESCRIPTION OF THE DRAWINGS

A better understanding of the present invention may be obtained when the following detailed description is considered in conjunction with the following drawings, in which.

DETAILED DESCRIPTION OF THE INVENTION

Figure 1:
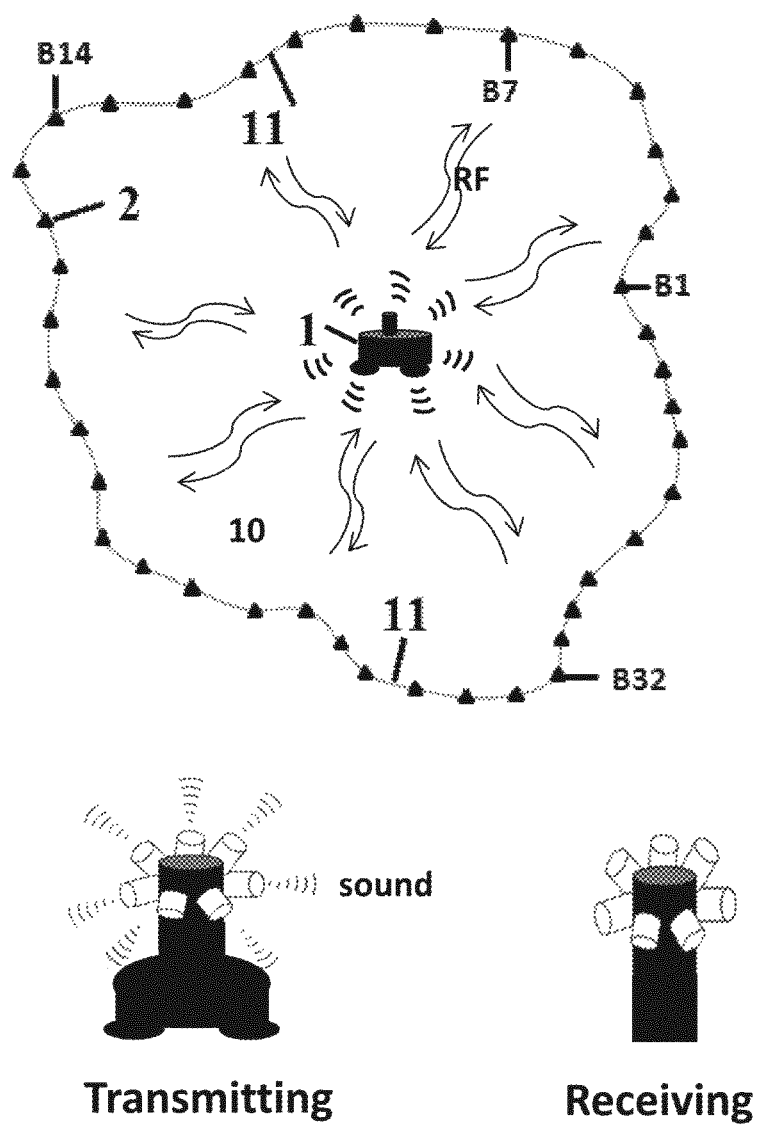
FIG. 1 illustrates a robot inside a working region with boundary posts placed along the boundary line. The ultrasonic sensors and RF transceivers are on the robot and on the boundary posts.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

At least some embodiments relate to a local mapping and tracking system for robots for various robotic applications. The local mapping and tracking system according to this invention includes a robot coupled with a plurality of boundary posts. The robot moves and does the works inside a region enclosed by a boundary line. The boundary posts are placed near the boundary line. The boundary line is either a real physical boundary, such as a wall or a fence or a border, or a virtual trace which is not a real object. The boundary line is to be defined by the robot users depending on their needs or preferences. Robot users place the boundary posts at various positions, along the boundary line, to enclose a region, such that the robot moves and does the works inside the region. The exact coordinates of boundary posts may be not defined when the boundary posts are placed. Users may place a plurality of the boundary posts at selected locations to define a region without predetermining or knowing the exact coordinates of selected locations. In one embodiment, with the placement of boundary posts along the boundary line, a region is configured such that the robot moves and does the works inside the region.

In one embodiment, for the robot to move smartly and efficiently inside the region, the robot must know the configuration or the geometry of the working region, and where is the outer boundary. With the placement of boundary posts along the boundary line, the robot must determine a map or a region enclosed by the boundary posts. In this regard, the robot must determine the locations of the boundary posts. In another embodiment, for the control of the moving route of the robot, the robot must also know its position with respect to the boundary posts, and the tracking of the position of the robot is needed. This application discloses a mapping and tracking system for robot to move and to work inside a region.

The advantages of the local mapping and tracking system for robot are explained in detail in the text and with figures below. FIG. 1 illustrates a robot 1 inside a region 10 enclosed by the boundary posts 2 placed along the boundary line 11. In one embodiment, the robot 1 contains an RF transceiver and a plurality of ultrasonic transmitters. The ultrasonic transmitters on the robot 1 transmit ultrasonic wave toward boundary posts 2. The ripples in FIG. 1 represent the transmission of ultrasonic waves from robot 1 toward boundary posts 2. The sound wave is sent out from the robot 1 toward boundary posts 2 in a broadcasting manner such that the boundary posts 2 along outer boundary line 11 receive the sound waves from the robot 1. The relative distances in between the robot 1 and the boundary posts 2 are determined when the time-of-flight of sound waves are measured. The RF transceiver on the robot 1 transmits the RF signals to the boundary posts 2 and receives the RF signals from boundary posts 2. The arrows in FIG. 1 represent the transmitting and the receiving of the RF signals. The B1 to B32 are the boundary posts 2. The number of boundary posts 2 used in the system depends on the geometry of the region. Simpler geometry of region requires fewer boundary posts 2 while a complex geometry of the region may need more boundary posts 2. In another embodiment, each boundary post 2 contains an RF transceiver and at least one ultrasonic receiver. The ultrasonic receiver on each boundary post 2 receives ultrasonic wave from the robot 1. A plurality of ultrasonic receivers may be placed on each boundary post 2 as a star pattern, to receive sound waves from various directions. The RF transceiver on each boundary post 2 transmits the RF signals to the robot 1 and receives the RF signals from the robot 1.

In one embodiment, RF transceiver from either robot 1 or boundary posts 2 may be used to synchronize and calibrate the clock times of robot 1 and boundary posts 2. The RF transceivers are also used to transmit and receive the data in between the robot 1 and the boundary posts 2. The transmitted and the received data may be distance, boundary post number, ultrasonic receiver number, sound wave direction, clock times, conditions of boundary posts 2, or other environmental parameters. With the synchronization and calibration of clock times, the RF data transmission and receiving, and the measurements of traveling times of ultrasonic sound waves from the robot 1 to the boundary posts 2, the robot 1 determines its relative distances to the boundary posts 2. As the robot 1 keeps traveling inside the working region, it may keep collecting the relative distances to the boundary posts 2. In one embodiment, the robot 1 may be equipped with an odometer such that it also determines or records its own moving traveling distances and the traveling directions. The combination of the robot's traveling distances and the data of relative distances to the boundary posts 2 may clearly define the position of the robot 1.

Figure 2:
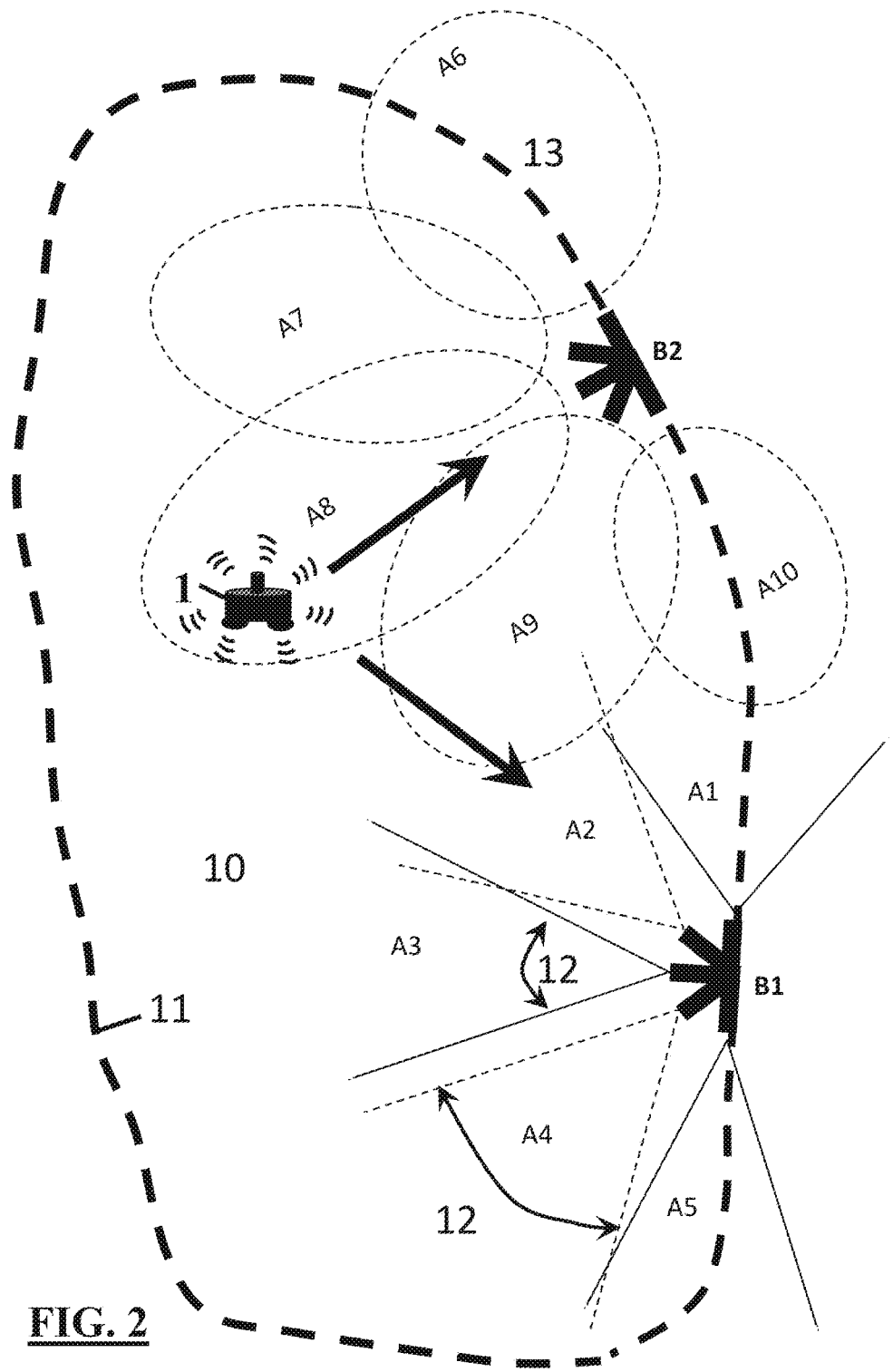
FIG. 2 illustrates a robot inside a working region, and the boundary posts which contain a plurality of ultrasonic receivers are placed along the boundary line.

FIG. 2 illustrates that each boundary post 2 may have one or more than one ultrasonic receiver. The ultrasonic receivers receive the sound waves from the robot 1 such that the relative distances in between the robot 1 and the boundary posts 2 are determined based on the time-of-flight of sound waves. In another embodiment, the ultrasonic receivers on each boundary post 2 not only determine the relative distances in between the robot 1 and the boundary post 2, but also determine the direction of incoming sound wave from the robot 1. In the figure, an array of ultrasonic receivers is placed on the boundary posts 2. Each ultrasonic receiver, with a receiving angle, covers a specific working area pointing to a specific direction. The wedge shape or oblong shape of working areas refer to the locations of sound sources or robot for which robot may transmit the sound waves to the boundary posts 2, such that the ultrasonic receivers on the boundary posts 2 detect the sound waves. The identification of which ultrasonic receiver receives the sound wave determines not only the distance but also the relative direction or angle in between the robot 1 and the boundary post 2. In the figure, the boundary post B1 covers five working areas, A1, A2, A3, A4, and A5 respectively, and the ultrasonic receivers on the boundary post B2 cover the working areas of A6, A7, A8, A9, and A10. When the robot is at the position as shown in the figure, the boundary post B1 may determine the robot 1 is at working area A2, the boundary post B2 may determine the robot 1 is at working at A8, such that the rough position of the robot is determined. The sizes of working areas and the receiving angles depend on the designs of ultrasonic transmitter and ultrasonic receiver. In one embodiment, more than one ultrasonic receiver on the boundary post 2 may receive the sound wave from the robot 1, and the analyses of receiving sound waves, such as magnitudes, profiles, angles, directions, and spectrums, may determine the directions and the distances in between the robot 1 and the boundary posts 2.

The boundary posts, B1 and B2, in FIG. 2, sit along the boundary line 11, and the boundary line 11 is relatively straight at the locations of these two boundary posts 2. The ultrasonic receivers are placed to face internal region 10 to guide the moving of robot 1. The receiving angles of ultrasonic receivers are configured to cover a portion of internal region 10, such that when the robot 1 travels into the region, the boundary posts 2 detect the sound waves from the robot 1. With the configuration, each boundary post 2, not only help determine its distance to the robot 1, but also identify the direction of incoming sound wave from the robot 1. As the robot 1 keep moving and working inside the region, the ultrasonic receivers on the boundary posts 2 keep updating the relative directions and angles to the robot 1.

The determination of the incoming sound wave direction helps track the position of the robot 1. One simple application is that each boundary post 2, with the ultrasonic receivers facing internal working region, may determine the robot is at its right side or left side such that the robot 1 may be guided to move from one side of the boundary post 2 to the other side of the boundary post 2, and to move from one boundary post 2 toward the other boundary post 2. A more sophisticated application is to determine the incoming sound wave directions from a plurality of ultrasonic receivers on a plurality of boundary posts 2, such that, with the collected sound wave directions, the position of the robot 1 may be pinpointed. The determination of relative directions of the robot and boundary posts makes the tracking and mapping an easy work. In one embodiment, as the robot 1 moves near a group of the boundary posts 2 at a local area, the robot 1 may utilize the info of relative directions from local boundary posts 2 to determine its moving route at the area.

Figure 3:
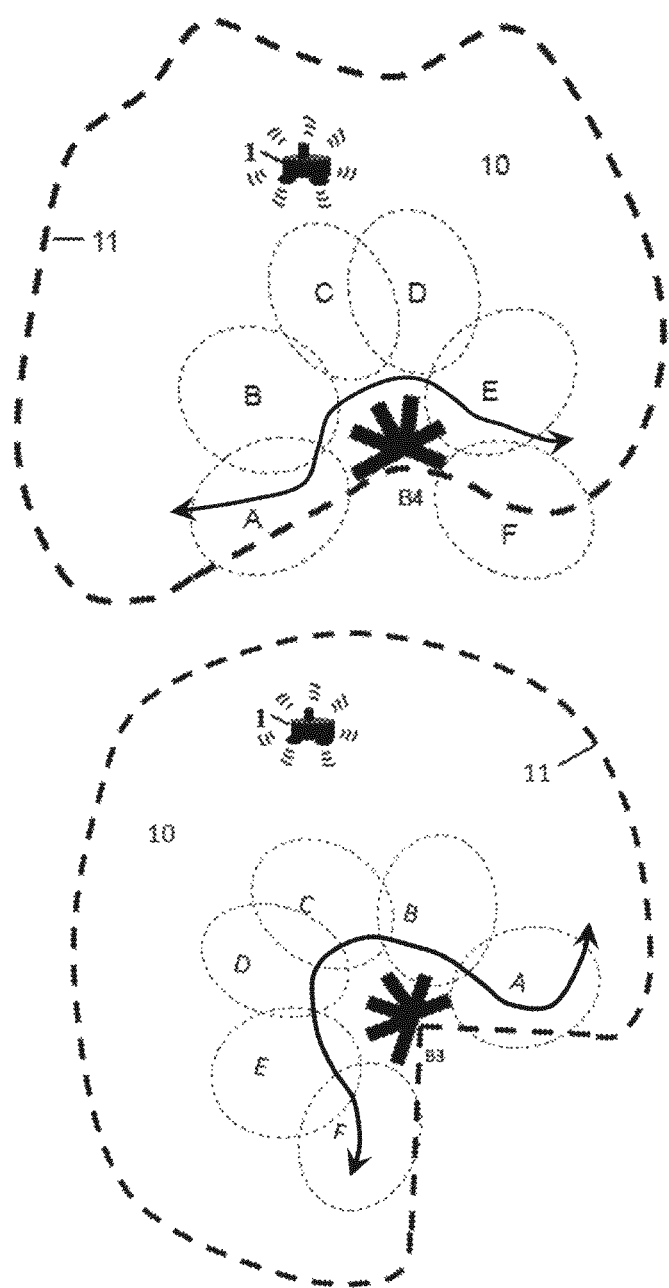
FIG. 3 illustrates a robot inside a working region, and the boundary posts which contain a plurality of ultrasonic receivers are placed along the boundary line.

FIG. 3 illustrates a boundary post 2 at a corner of the boundary line 11. The irregular geometry of the robot's working region 10 is very common for various applications and the placing of the boundary posts 2 at critical positions, such as corners, on the boundary line 11 to map the working region is needed. The boundary posts 2 placed at the critical locations guides the moving of the robot, maps the geometry of the working region, and prevents the robot 1 from traveling to outside. In one embodiment, the numbers of ultrasonic receivers and the receiving angles of ultrasonic sensors are adjustable such that the ultrasonic receivers determine the relative positions and relative directions in between the robot 1 and the boundary posts 2. In the figure, the ultrasonic receivers on the boundary post B3 and B4 may guide the robot 1 to turn its traveling directions in order not to travel to outside of the working region 10. With the ultrasonic receivers facing internal working region, the ultrasonic receivers on the boundary posts 2 placed at critical locations, the mapping and tracking system guides the robot 1 to move from one area to another area without the risks of going out the boundary line 11.

Figure 4:
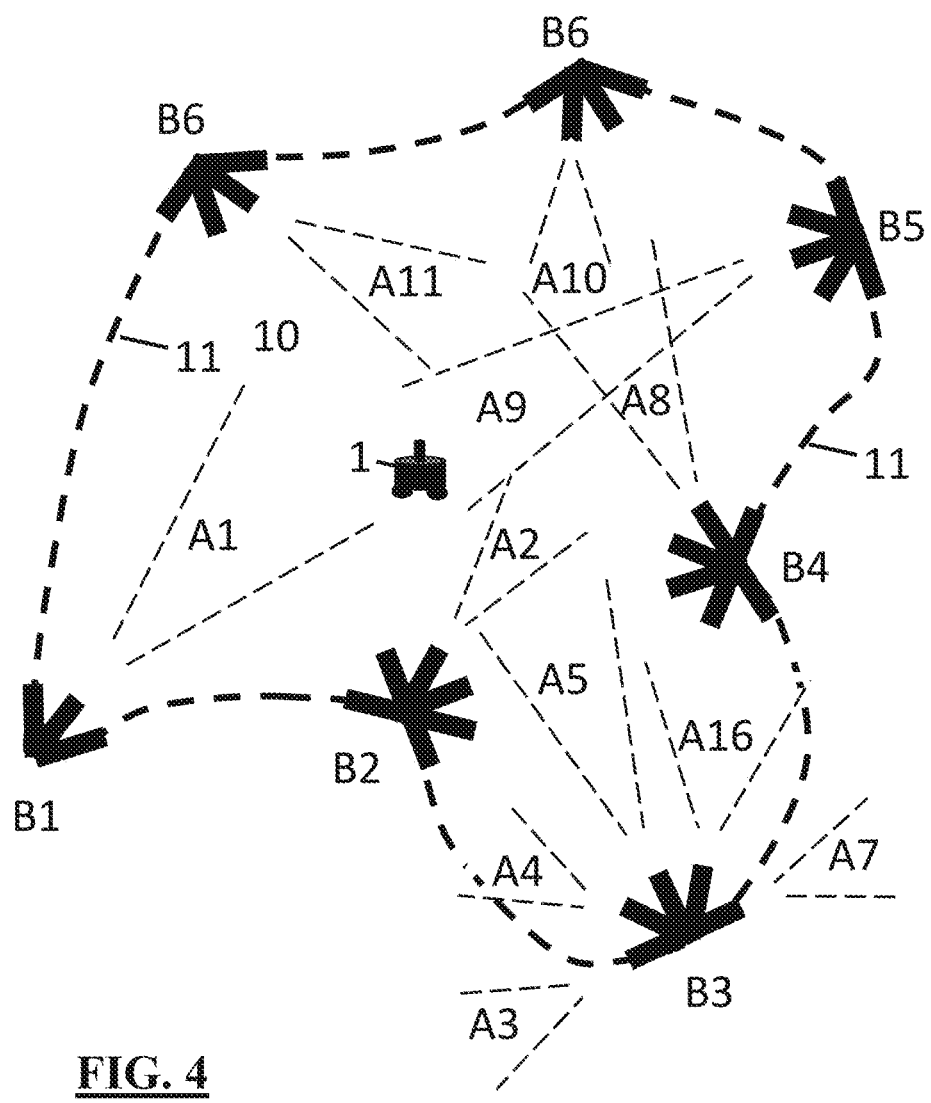
FIG. 4 illustrates a robot inside a working region, and the boundary posts which contain a plurality of ultrasonic receivers are placed along the boundary line.

FIG. 4 illustrates the placements of a plurality of the boundary posts 2, such as B1 to B7, along the boundary line 11. The boundary posts 2 may have different numbers of the ultrasonic receivers, and the ultrasonic receivers may have different receiving angles pointing to different directions to cover different working areas. The receiving angles of the ultrasonic receivers on the boundary post B1 cover less than 90 degrees, while other ultrasonic receivers on other boundary posts, B2 to B6, cover 180 degrees or more than 180 degrees. Each boundary post 2 determines which of its ultrasonic receiver receives the sound wave from the robot 1. More than one ultrasonic receiver may receive the sound wave from the robot 1 at the same time if their ultrasonic receiving angles are overlapped or arranged to cover a predetermined direction. In one embodiment, the boundary posts 2 may not be able to receive the sound wave, if the robot's position is not along with one of the receiving directions. In another embodiment, a plurality of boundary posts 2 may determine their relative directions to the robot depending on which ultrasonic receivers receive the incoming sound waves.

Using appropriate numbers of ultrasonic receivers on the boundary posts 2 and placing appropriate number of boundary posts 2 map the boundary line 11 and cover the working region 10. As the robot 1 keeps moving and working inside the working region 10 and keeps collecting the relative distances with respect to boundary posts, along with the determination of sound wave directions to the boundary posts, the positions of the robot may be pinpointed. With the collected distances and directions, the robot's moving positions are monitored, tracked, and controlled. Robot users may control the moving of the robot according their needs and preferences, and a specific moving route may be designated.

Figure 5:
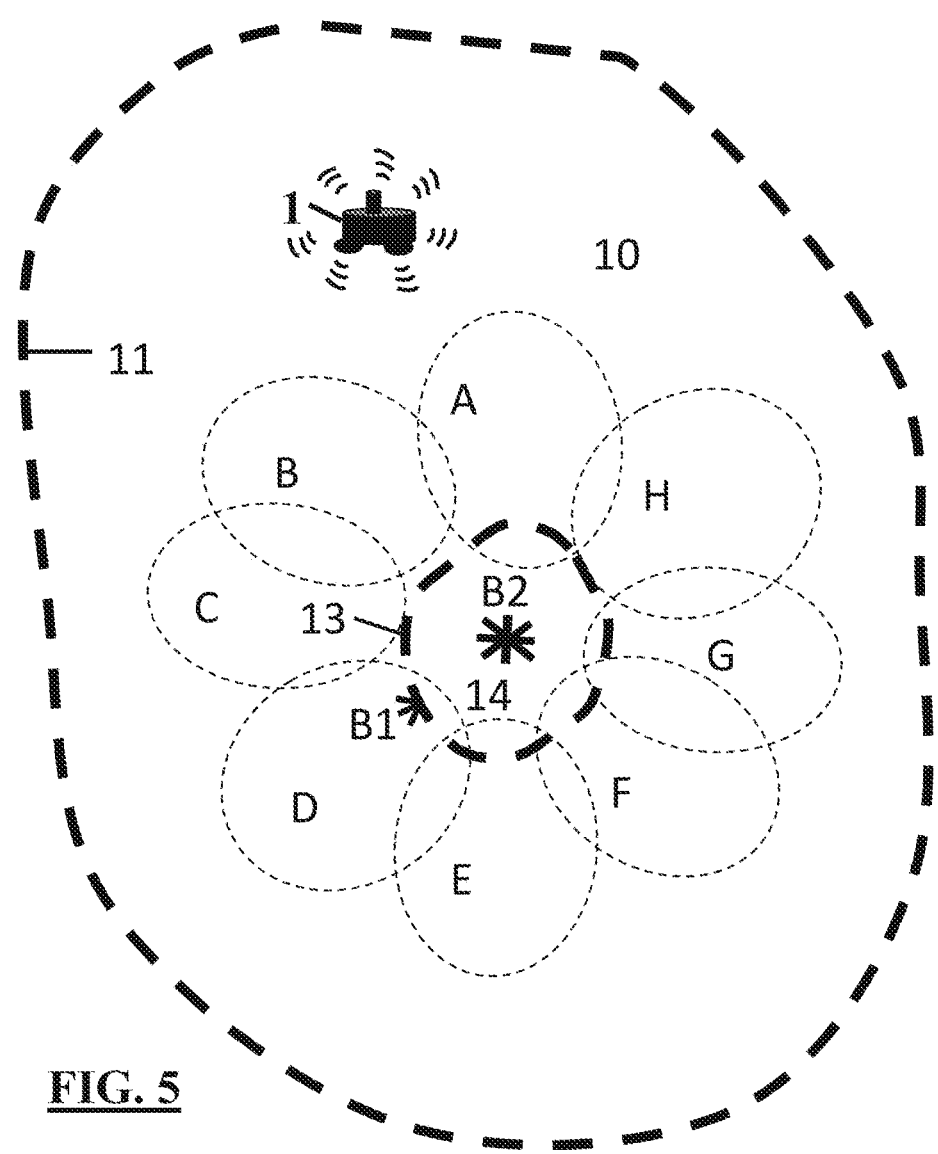
FIG. 5 illustrates a boundary post is placed in the middle of the working region.

In one embodiment, the placing of the boundary posts 2 are not limited to be only along the exterior boundary line 11, the boundary post 2 may be placed in the middle of the working region. In practical applications, the robot's working region may have objects or areas not allowed robot to pass through, in this regard, the boundary posts 2 may be placed along the interior boundary line 13, such as boundary post B1 as shown in FIG. 5. A plurality of boundary posts 2 placed along the interior boundary line 13 prohibits the robot from entering the blocked region 14. The boundary post B1 is placed along the internal boundary line 13 with its ultrasonic receivers facing working region 10 which is enclosed by exterior boundary line 11. In another embodiment, the boundary posts 2 may be placed inside the object such as B2. The placing of boundary post B2 may help define the relative directions, among the devices, so as to better guide the moving of the robot. The internal boundary posts 2, similar as external boundary posts 2, may be used to guide the moving of the robot 1 and to measure the relative distances and relative directions.

Figure 6:
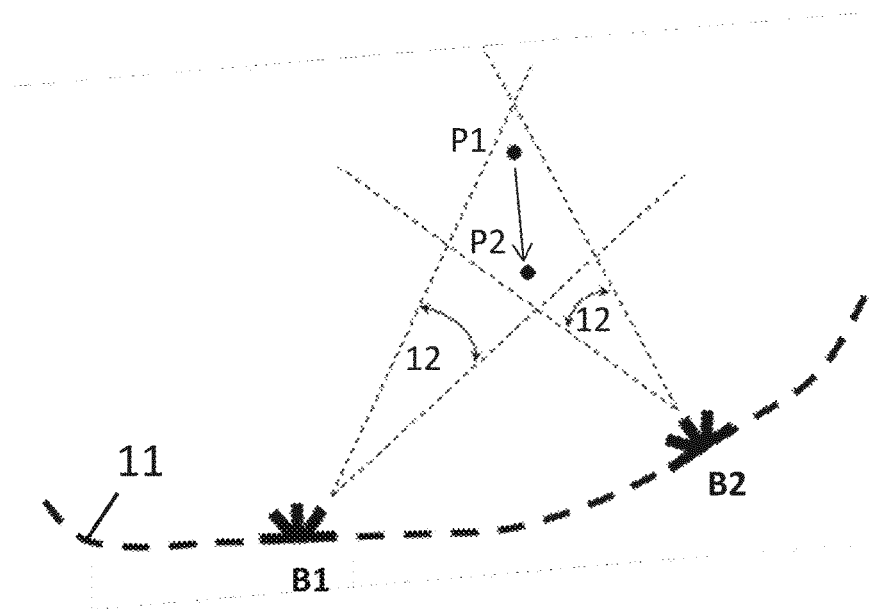
FIG. 6 illustrates a robot moves and works inside a working region to determine the relative positions of the robot and the boundary posts.
Figure 6:
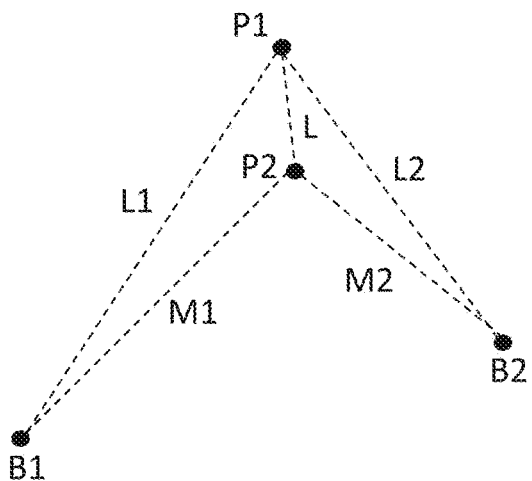

The ultrasonic receivers on the boundary posts 2 determine the distances to the robot 1 and also determine the direction of the robot 1. FIG. 6 illustrate the robot is originally at a position P1 to broadcast the sound waves toward the boundary posts 2, and one or more than one of the ultrasonic receivers, with receiving angles 12, detect the sound wave to determine the relative distances and relative directions. The dash lines in the figure illustrate the possible sound sources directions from two ultrasonic receivers on boundary posts B1 and B2. The determination of sound source directions helps zoom in the location of robot, but the exact position is not yet accurately defined. However, as the robot keeps traveling and working inside the working region, such as from position P1 to position P2, the exact position of the robot is determined. The figure illustrates the relative distances in between the robot 1 and the boundary posts 2 are L1 and L2 when the robot is at position P1, and as robot 1 travels a length L along a predetermined direction to a new location P2, the robot collects the new relative distances M1 and M2. With the known relative distances L1, L2, M1, M2, and the traveling length L, the exact position of the robot is determined with trigonometry. The traveling distance L may be determined with an odometer on the robot 1. The identifications of the directions of the robot 1 with respect to the boundary posts 2, coupled with the measurements of the relative distances in between the robot 1 and the boundary posts 2, and the traveling length, determine the exact positions of the robot 1 as it moves and works inside the working regions.

Figure 7:
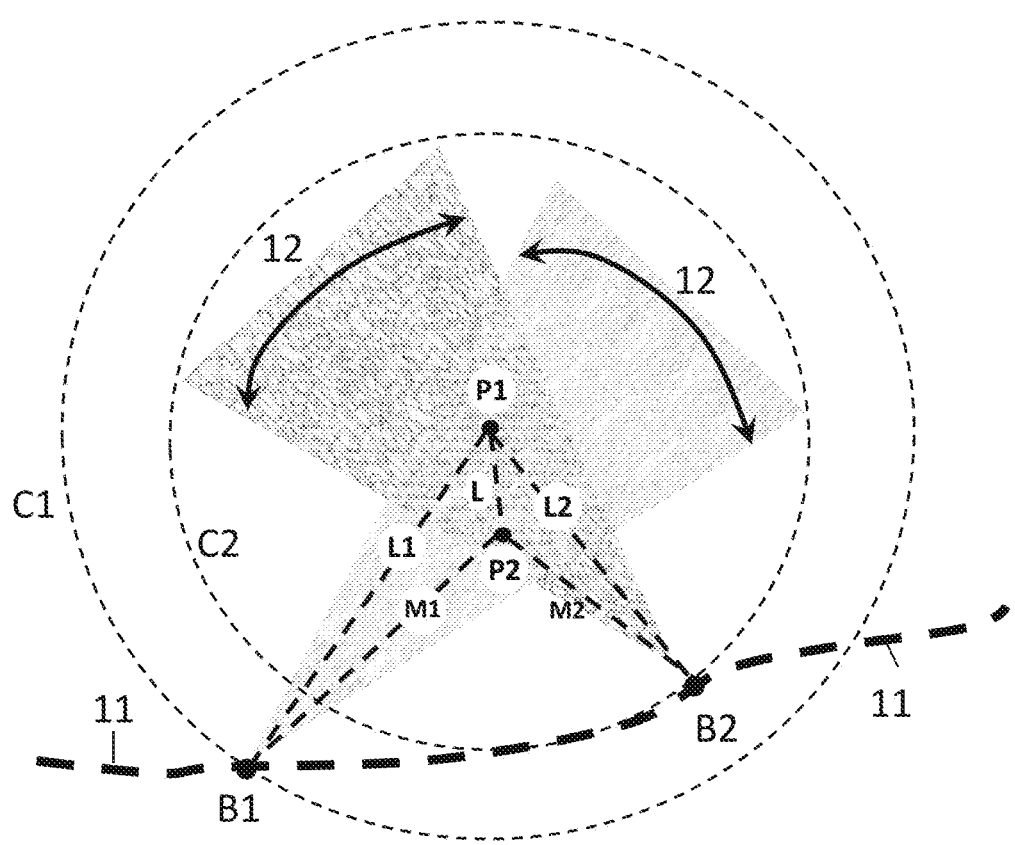
FIG. 7 illustrates a robot moves and works inside a working region to determine the relative positions of the robot and the boundary posts.

The advantages of using ultrasonic receivers on the boundary posts 2 to determine the exact position of the robot 1 are further explained in FIG. 7. The robot 1 is initially at position P1 to obtain the relative distances L1 and L2 to the boundary posts B1 and B2. With the measurements of time-of-flights of sound wave, the magnitudes of the relative distances of L1 and L2 are determined. However, the robot 1 does not know the exact positions of the boundary posts of B1 and B2, because B1 may be located at any points on the circle C1, and B2 may be located at any points on the circle C2. With the determinations of receiving angles 12 from two ultrasonic receivers on the boundary posts B1 and B2, the exact position of the robot is pinpointed. The figure demonstrates the usage of two receiving angles to pinpoint the position of the robot 1. In one embodiment, more than two receiving angles from the ultrasonic receivers on the boundary posts 2 may be used to identify the position of the robot 1. FIG. 7 demonstrates the usage of two ultrasonic receivers from two boundary posts 2 to pinpoint the position of the robot. In another embodiment, more than two ultrasonic receivers from more than two boundary posts 2 may be used to pinpoint the position of the robot 1.

The placement of appropriate number of boundary posts 2 along the boundary line 11 confines the robot 1 inside the working region 10, and the virtual connection of boundary posts 2 defines the outer border of the working region 10. The boundary posts 2 are used to map the working region 10, and more boundary posts 2 placed along the boundary line 11 may better define the geometry of the working region 10. However, it is not practical to place excessive number of boundary posts 2 to capture all the curves of the boundary line 11. The irregular shape or curvy boundary line 11 make the capturing of the geometry of the working region 10 more difficult. FIG. 8A shows the robot 1 inside a working region 10 and the boundary posts 2 are placed at the border. The boundary posts 2 may be not able to capture all curvy boundary line 11. In the figure, the boundary line 11 in between the two boundary posts B1 and B2 is not a straight line, and a virtual straight line connecting B1 and B2 will miss the curves. In one embodiment, there is no need to place excessive number of boundary posts 2, when there is a boundary line sensor 15 built on the robot 1, as shown in FIG. 8B. The boundary line sensor 15 may be a light sensor, a color sensor, a distance sensor, a pressure or a force sensor, a sound sensor, or an image sensor, and the boundary line sensor 15 may be placed at the bottom, at the side, or at the top of the robot 1. A photoelectric sensor detects the differences in reflectivity, a color sensor detects the differences of colors, a sound sensor detect the differences in height or distance and also the differences of reflected sound waves from different surfaces, a pressure or force sensor detects the resistances of forces and pressures, an IR sensor could detect the differences in temperatures, an image sensor may differentiate the differences in images, and all these sensors may be used to differentiate the working and non-working areas, as shown in FIG. 8C. The boundary line sensor 15 may be an active or a passive device. An active device sends out a signal and waits for the reflected signal, while a passive device does not send out a signal and it only waits for the incoming signal from the environment. In the figures, the boundary line sensors 15, built on the robot, are pointing to the ground to detect if the pointed area is a robot working region 10 or not. In one embodiment, the robot with a boundary line sensor 15, may also have an odometer. The robot 1 may use its boundary line sensor 15 to travel along the border of the working region 10, and use its odometer to record the traveling directions and lengths.

Figure 8:
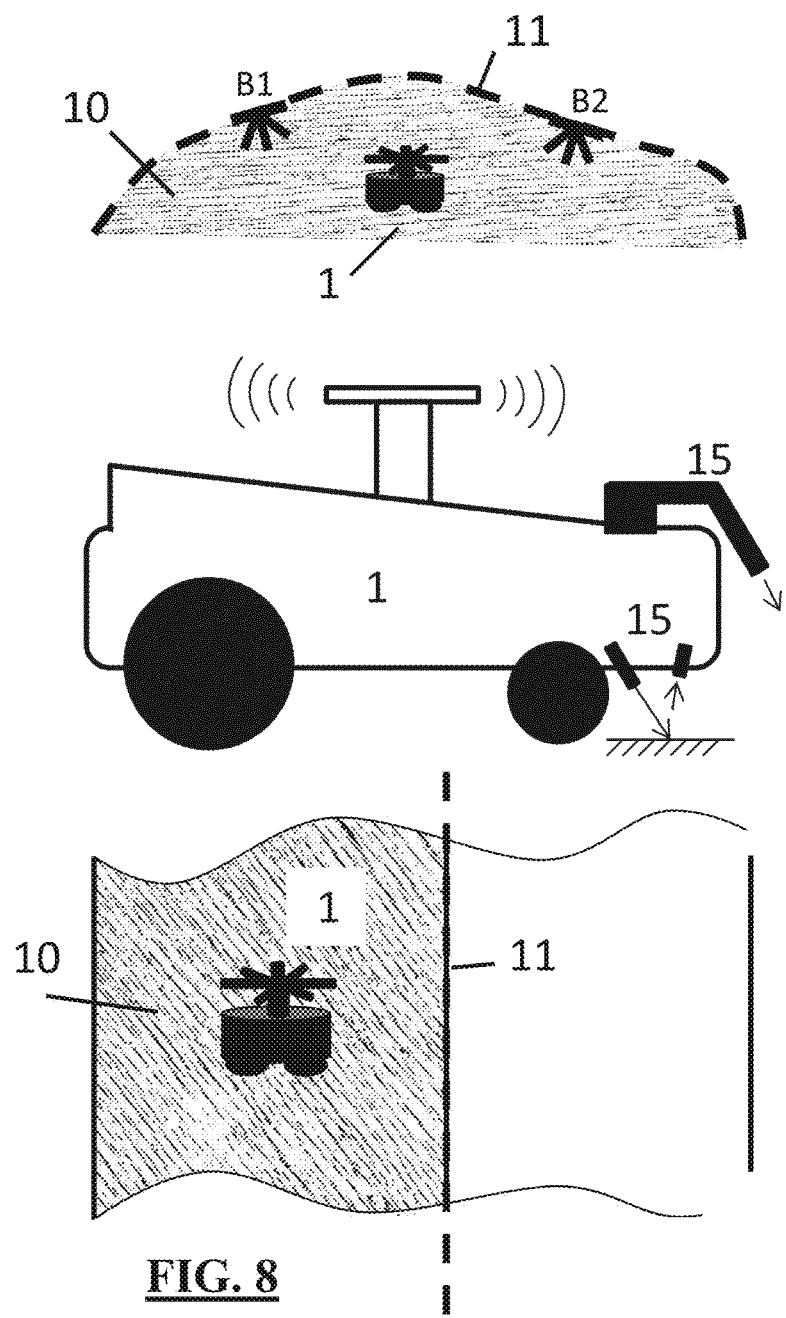
FIG. 8 illustrates a boundary line sensor placed on the robot.

In another embodiment, with the schemes demonstrated and explained in FIG. 7 and FIG. 8, which are using ultrasonic receives to identify the relative directions and distances, and using boundary line sensor 15 and odometer to identify the border of the working region 10, in such a manner, the robot 1 maps the working region 10 and tracks its position with respect to the boundary of the working region 10. In one embodiment, a plurality of boundary line sensors 15 may be built on the robot to distinguish the differences of working region 10 and no-working region.

Figure 9:
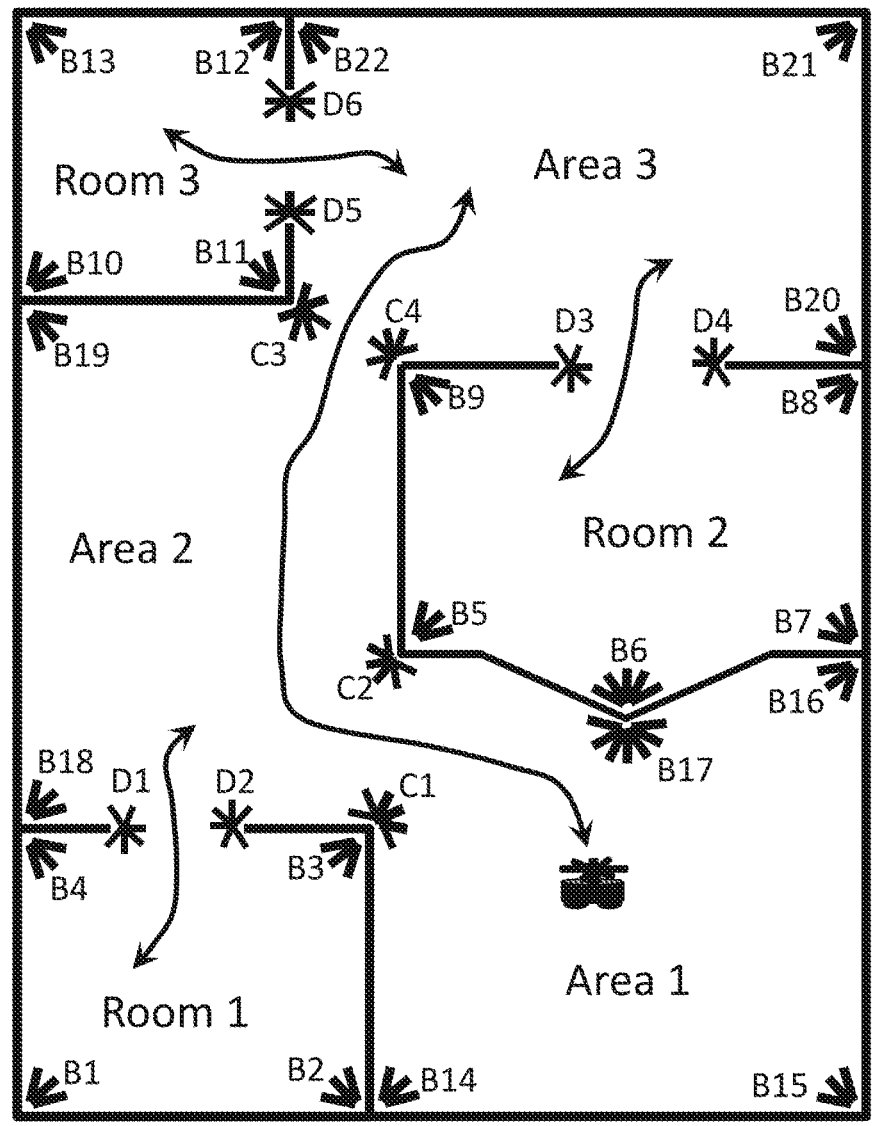
FIG. 9 illustrates the boundary posts are placed at various indoor locations.

The mapping and tracking system is useful for indoor robots to do for example the floor cleaning. The boundary posts 2 may be placed at various locations to guide the moving of the robots, and FIG. 9 illustrates the applications.

The boundary posts 2 may have different number of ultrasonic receivers pointing to different directions. In one embodiment, boundary posts 2 may be placed at the corners of the rooms, such B1 to B4 at room 1, B5 to B9 at room 2, and B10 to B13 at room 3. The ultrasonic receivers are pointing to the central areas of the rooms to detect the sound wave from the robot. Inside each room, the robot is confined with the walls except at the doors or entrances. The placing of the boundary posts 2 at the corners identifies the sizes and the geometries of the rooms. The furniture and appliances inside the rooms may block or delay the transmitting and the receiving of ultrasonic waves, and the measurements of distances in between the robot 1 and boundary posts 2 may be not very accurate due to the bouncing and the reflection of the sound waves. However, as the robot keeps moving and keeps collecting the distances, the configurations of the rooms may be calibrated and determined such that the robot may be guided to do the works inside the rooms. One of the advantages of the disclosure is that the ultrasonic transmitter is on the robot and the ultrasonic receivers are on the boundary posts 2. After transmitting the ultrasonic sound waves, the robot does not receive reflected sound echo to determine its distances to the objects. In another embodiment, the boundary posts 2 used for these rooms are different from those infrared proximity sensors. The use of infrared lights to measure the distance is usually limited to a short length, for example 10-80 cm, such that the infrared lights may be not able to determine the distances when the robot and boundary posts are farther apart. The infrared proximity sensor also needs to send out and to receive the infrared light using the same sensor on the robot, thus, the mapping and tracking mechanisms may be either impossible or too complex.

In one embodiment, the boundary posts 2 may be placed at the door entrances, such as D1 and D2 for room 1, D3 and D4 for room 2, and D5 and D6 for room 3. As robot travels near the door entrances, the relative directions and distances in between the robot and boundary posts 2 are determined through previously explained mechanism, such that the robot may be guided to move from one room to another room. The boundary posts 2 placed at door entrances may be also used to prevent the robot from passing through such as if the work is not done inside a specific room. In another embodiment, the boundary posts 2 may be placed at gateways, such as C1 and C2, which sit at the gateway connecting area 1 with area 2, and C3 and C4, which sit at the gateway connecting area 2 to area 3. The boundary posts 2 at these gateways guide the robot to move from one area to another area. The boundary posts may be flexibly placed by users at various locations in the house depending on their needs and preferences, in such a manner, the moving route of the robot may be tracked, monitored, and controlled. All other variations of the placements of boundary posts 2 shall be considered within the scope of the disclosure.

Figure 10:
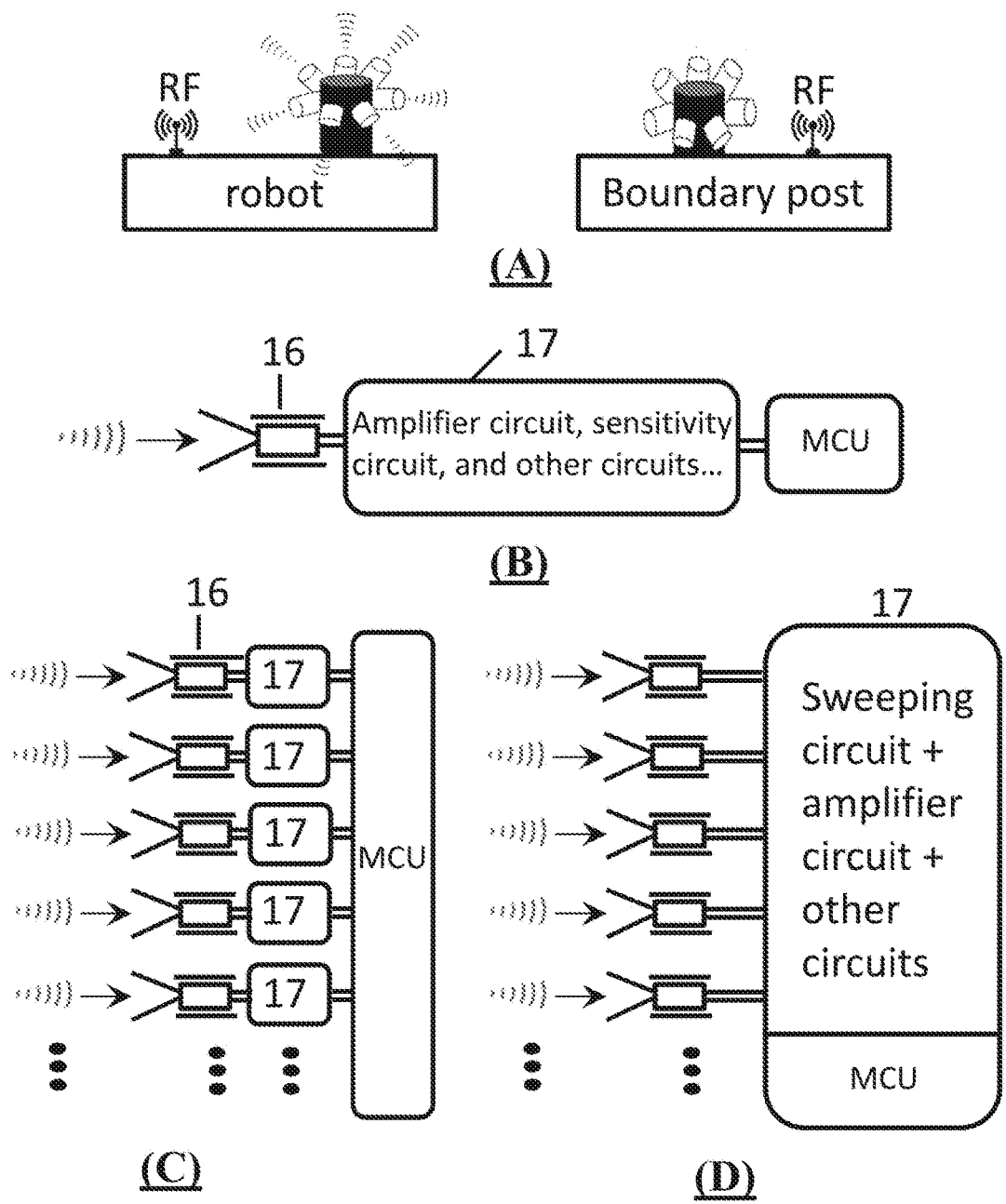
FIG. 10 illustrates ultrasonic receivers have a circuit to amplify and to process the sound wave from the robot.

FIG. 10A illustrates the implementations of the mapping and tracking system with the robot 1 and boundary posts 2. One RF transceiver is on the robot 1 and on each of the boundary post 2. The ultrasonic transmitters on the robot transmit ultrasonic waves toward boundary posts 2. One or more than one ultrasonic receiver may be placed on each of the boundary post 2, and each ultrasonic receiver may point to different direction with different receiving angle, to receive the ultrasonic wave from the robot 1. For the example in the figure, the ultrasonic sensors on both robot 1 and boundary post 2 are arranged as star patterns such that they may transmit or receive sound waves along various directions. The number of sensors and the pointing directions may be adjusted depending on the conditions of the working region 10.

In one embodiment, each ultrasonic receiver may contain a transducer 16 coupled with a circuit 17 and MCU, which stands for microcontroller, as shown in FIG. 10B, to detect and to analyze the incoming sound waves. The transducer 16 may use piezoelectric, capacitive, magnetostrictive, or diaphragm mechanism to detect the sound waves, and the sound waves are converted to electric signals. The ultrasonic sound wave decays rapidly in the air, during its traveling, and the circuit 17 coupled with the MCU amplifies and process the sound signals. In one embodiment, each transducer 16 may have its own circuit 17 to handle the amplification and processing of sound waves, as shown in FIG. 10C. With the configuration, the MCU may determine which ultrasonic receiver receives significant sound signals such that the distance and incoming sound wave direction are defined. The detected sound waves on each transducer 16 may be amplified and processed separately, or some or all of the detected sound waves from the transducers may be superposed together, for MCU to analyze the sound data. In another embodiment, instead of having separate circuit for each transducer, a combined circuit 17 may be used to amplify, to scan, and to analyze the data of sound waves, as shown in FIG. 10D. The combined circuit coupled with MCU may form a compact boundary post 2. The compactness of boundary posts 2 simplifies the implementation of the mapping and tracking system.

Figure 11:
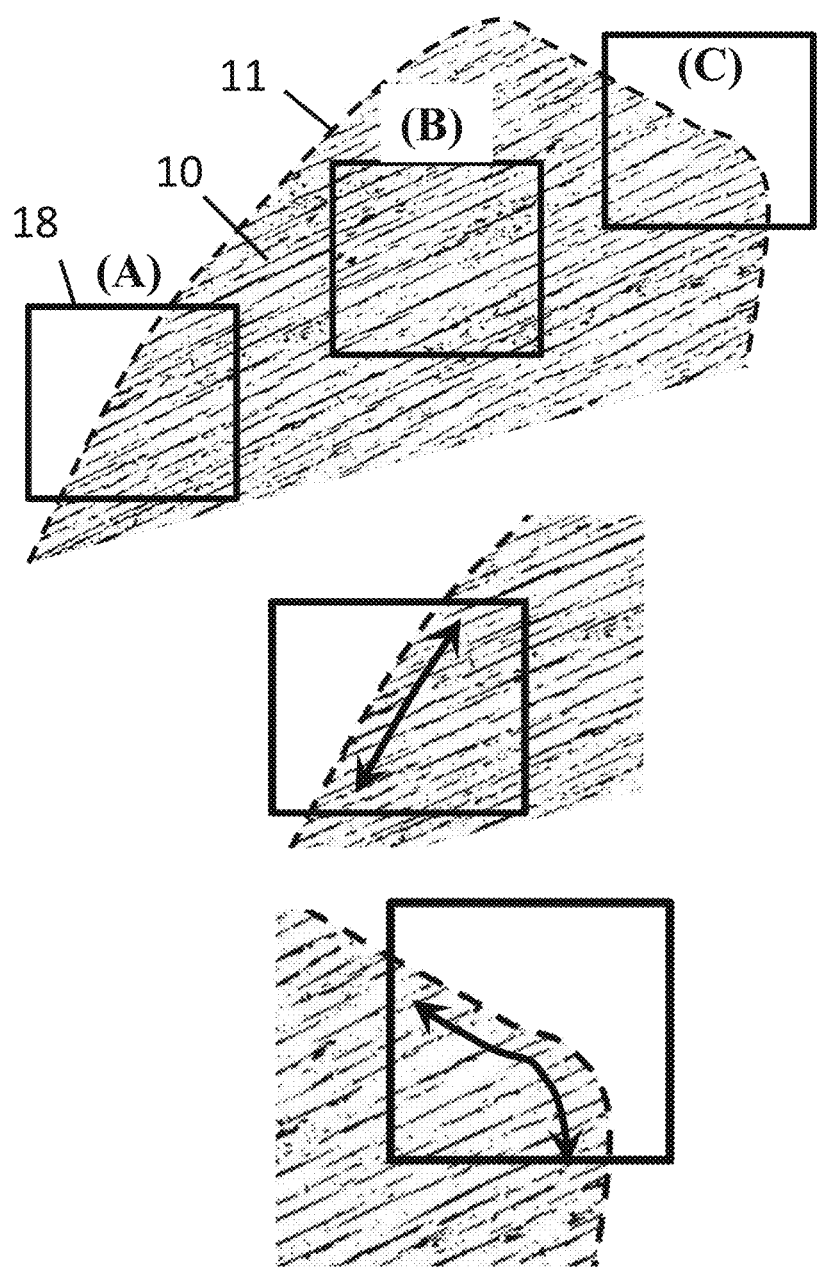
FIG. 11 illustrates the camera's imaging system to differentiate the inside and the outside of the working region.

In one embodiment, the boundary line sensor may be a camera pointing to a certain working region 10. The camera on the robot takes the images or videos of the working region 10 continuously, and analyzes and converts the images or videos into usable data to guide the moving of the robot. FIG. 11 illustrates an application of camera. The picture frames 18 of A, B, C are the images or videos taken by camera as robot travels to different locations at different times. In one embodiment, the inside and outside working regions may be separated with contour lines, as shown the dash lines in the figure, and the camera identify the contour lines, in such a manner, the robot may travel along the contour lines.

Figure 12:
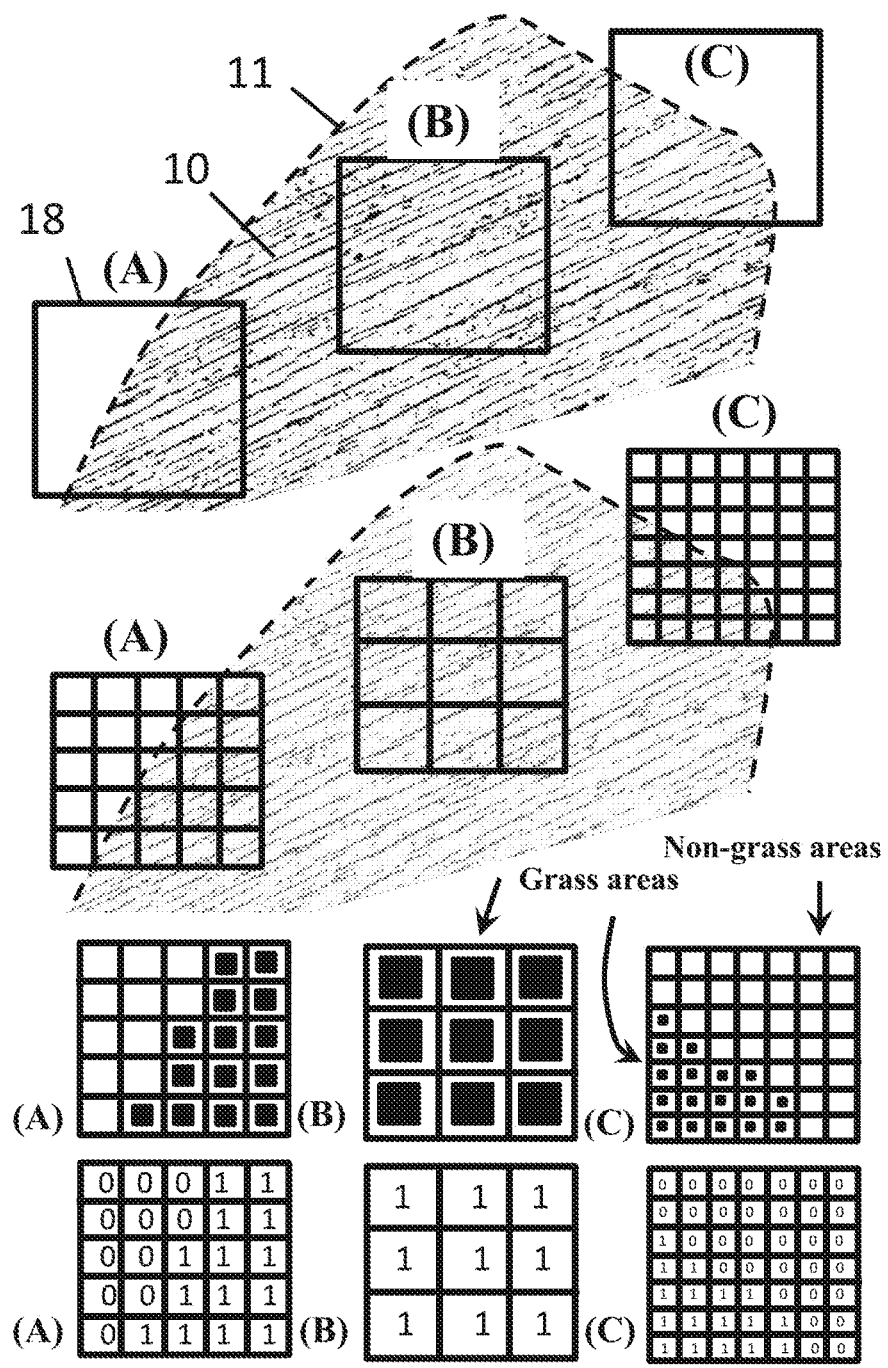
FIG. 12 illustrates the camera's imaging system to differentiate the inside and the outside of the working region.

In one embodiment, each picture frame may be further divided into smaller image boxes with a software procedure, for example picture frame A has 5 by 5 image boxes, picture frame B has 3 by 3 image boxes, and picture frame C has 7 by 7 image boxes. Each box collects its local images or videos at its local position. More boxes refer to more and smaller images or videos, or more data points, capturing the physical behaviors from the images or videos at those smaller areas. In one embodiment, a software procedure may be used to analyze the color, the texture, the temperature, the wave lengths, the reflectivity, the light emissions, and so on, to check if each image box is inside or outside the working region 10. For the image boxes located exactly at border line 11, the physical behaviors inside each image box may be averaged to determine if the image box is mostly inside or mostly outside the working region 10, and to determine if each image box area is mostly inside or mostly outside the border line 11. The average physical behaviors of each image box may be converted to usable data, such as a text, a color, a numerical number, or other software information to indicate each image box is inside or outside the working region 10. FIG. 12 illustrates an example of the physical behaviors inside the image boxes are converted to numerical numbers, with numbers 1 indicating the areas are mostly inside the working region 10, and numerical numbers 0 indicating the areas are mostly outside the working region 10. With the data inside the image boxes, the robot differentiates the areas are inside or outside the working region 10.

Figure 13:
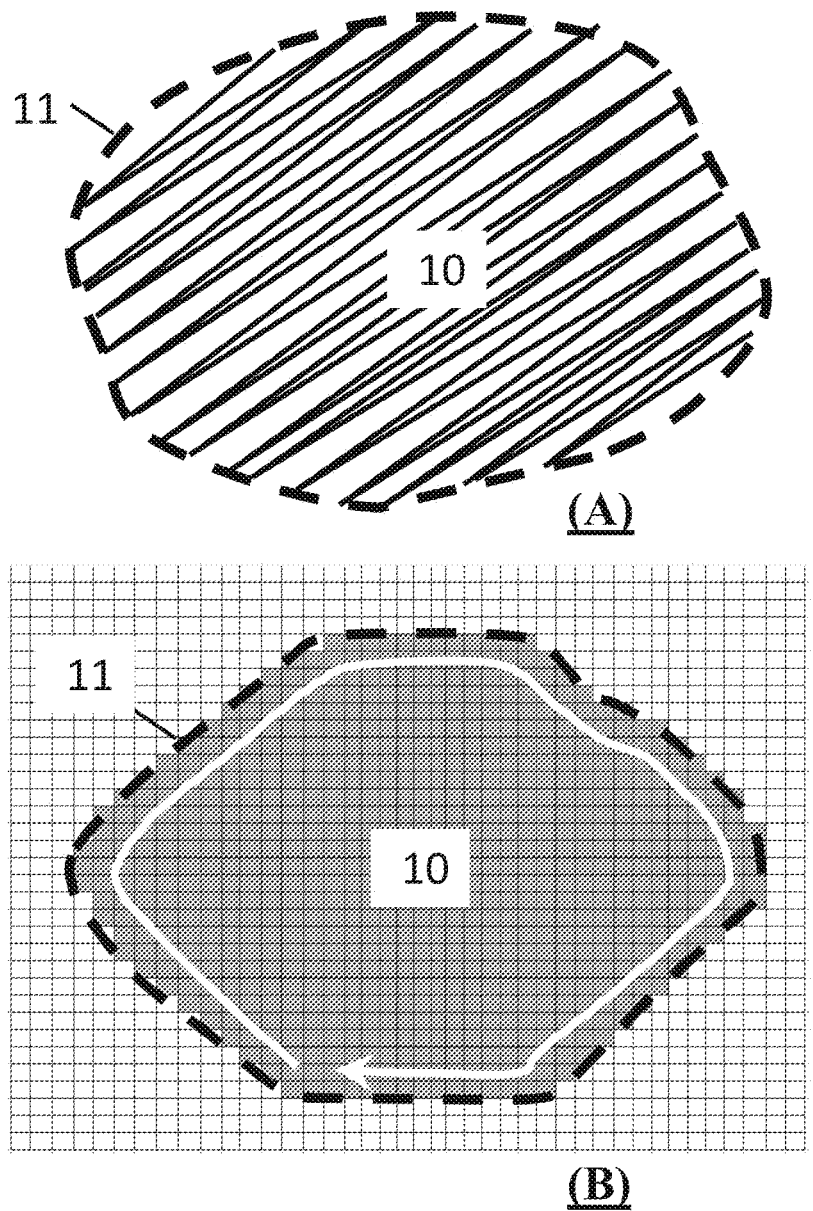
FIG. 13 illustrates the moving of the robot is guided with a camera's imaging system.
Figure 14:
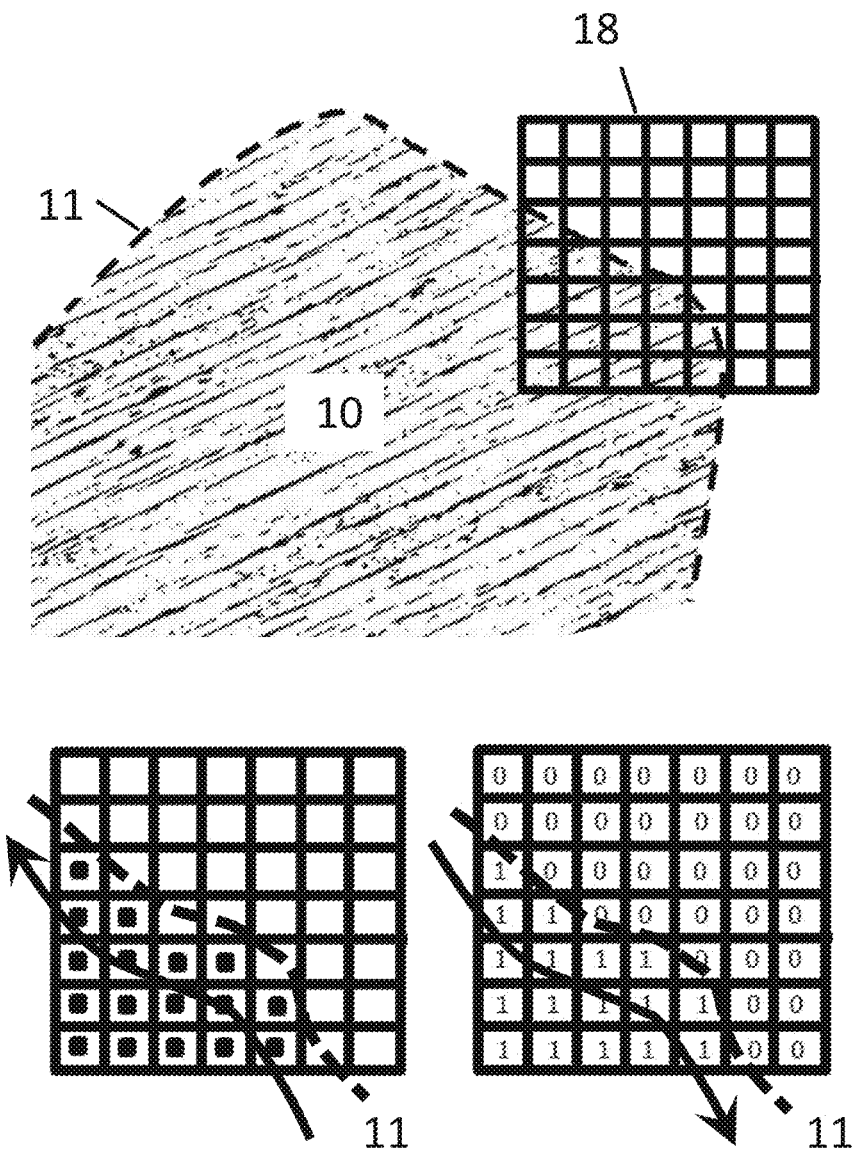
FIG. 14 illustrates the camera's imaging system to differentiate the inside and the outside of the working region.

In one embodiment, the robot may use the collected data of the boxes are inside or outside the working region 10 to determine the moving directions and distances. One implementation is that as camera detects a certain image box is outside the working region, the robot rotates and reverses its moving direction, as shown the zigzag lines in FIG. 13A, to cover entire working region. A more complex implementation is that the robot may move firstly along the border line 11, as shown in FIG. 13B, to cover outer peripheral areas, then to move at internal areas to cover internal working regions 10. The combination of various patterns may be used to cover entire working areas 10. FIG. 14 further illustrates the data of the image boxes may be used to guide the moving of the robot. The dash lines indicate the location of border and solid line with arrows may be the moving route of the robot. As robot travels to a particular area, the camera captures the images or videos of the image boxes, such that the position or the trace of the border line 11 may be determined, and a moving route may be implemented based on the image or video data of the image boxes. In one embodiment, the camera's focus and picture frame size may be adjusted, as shown the FIG. 15, to capture the local geometry of the working region, with top figure capture a smaller area and bottom figure capture a larger area. The captured smaller area refers to local image data and the captured larger area refers to global image data. In such a manner, the robot may use the image data to determine the moving route. In another embodiment, the camera may be mounted on a motor, and the motor may control the position, the height, and the viewing angle of the camera. As robot travels into an area with complex geometry, and captured data of the image boxes help robot determine a moving route.

Figure 16:
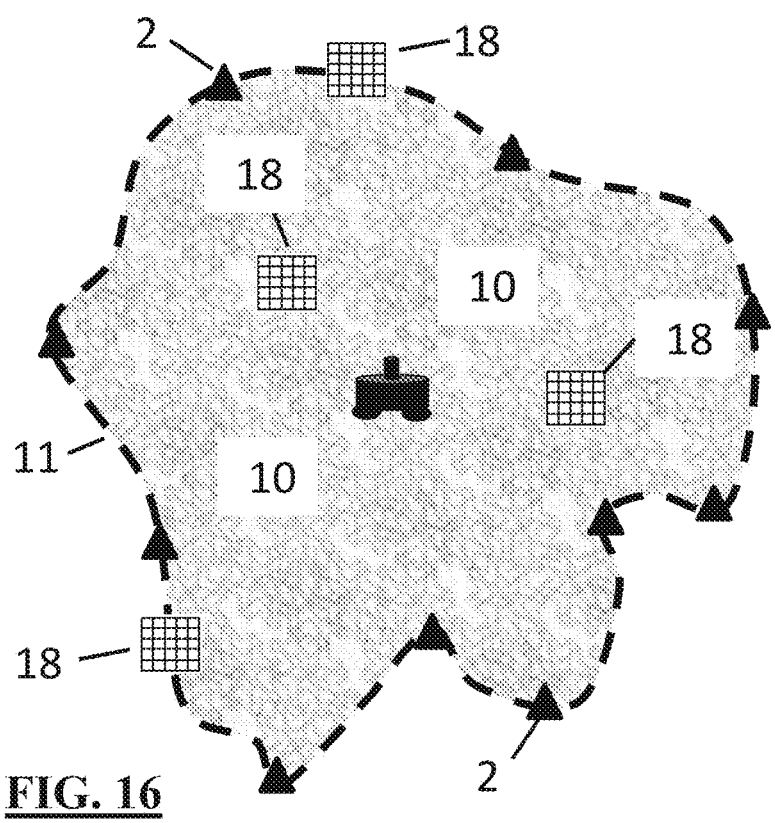
FIG. 16 illustrates the coupling of camera imaging system with the boundary post system to guide the moving of the robot.

Ideally the camera on the robot may be used to guide the robot to move to cover entire working region 10. As the camera detects the border line 11, the robot may change its moving direction to cover other areas. However, the images or videos taken by the camera may be limited to only local areas, and the camera on the robot may be not able to see entire working area, as shown in FIG. 16, which shows the sizes of picture frames 18 are limited at local locations. In one embodiment, the camera may be placed outside of the robot, at various locations and at different heights, to view entire working region, such that the robot may be able to see larger areas of working region 10 and the robot may be advised to cover entire working region. The robot and camera may communicate with each other with wire or wireless electronics.

In one embodiment, the boundary post system, which is using RF and ultrasonic devices on the robot and on the boundary post 2, may couple with the camera imaging system to guide the moving of the robot inside the working region 10. With the boundary post system, the relative positions of the robot and boundary posts 2 are determined, however, a working region 10 with irregular shapes or curves of boundary lines 11 may need excessive numbers of boundary posts 2. The robot's imaging system, on the contrary, monitors the local behaviors of areas such that robot tells if it is near the edge of the working region 10, and robot may use the image data to determine a moving route. With said imaging system, the excessive numbers of boundary posts 2 may be avoided, since robot's imaging system is able to distinguish the inside and outside of the working regions, especially when the robot is near the border lines 11. FIG. 16 illustrates the coupling of the two systems is used to guide the moving of the robot.

Figure 17:
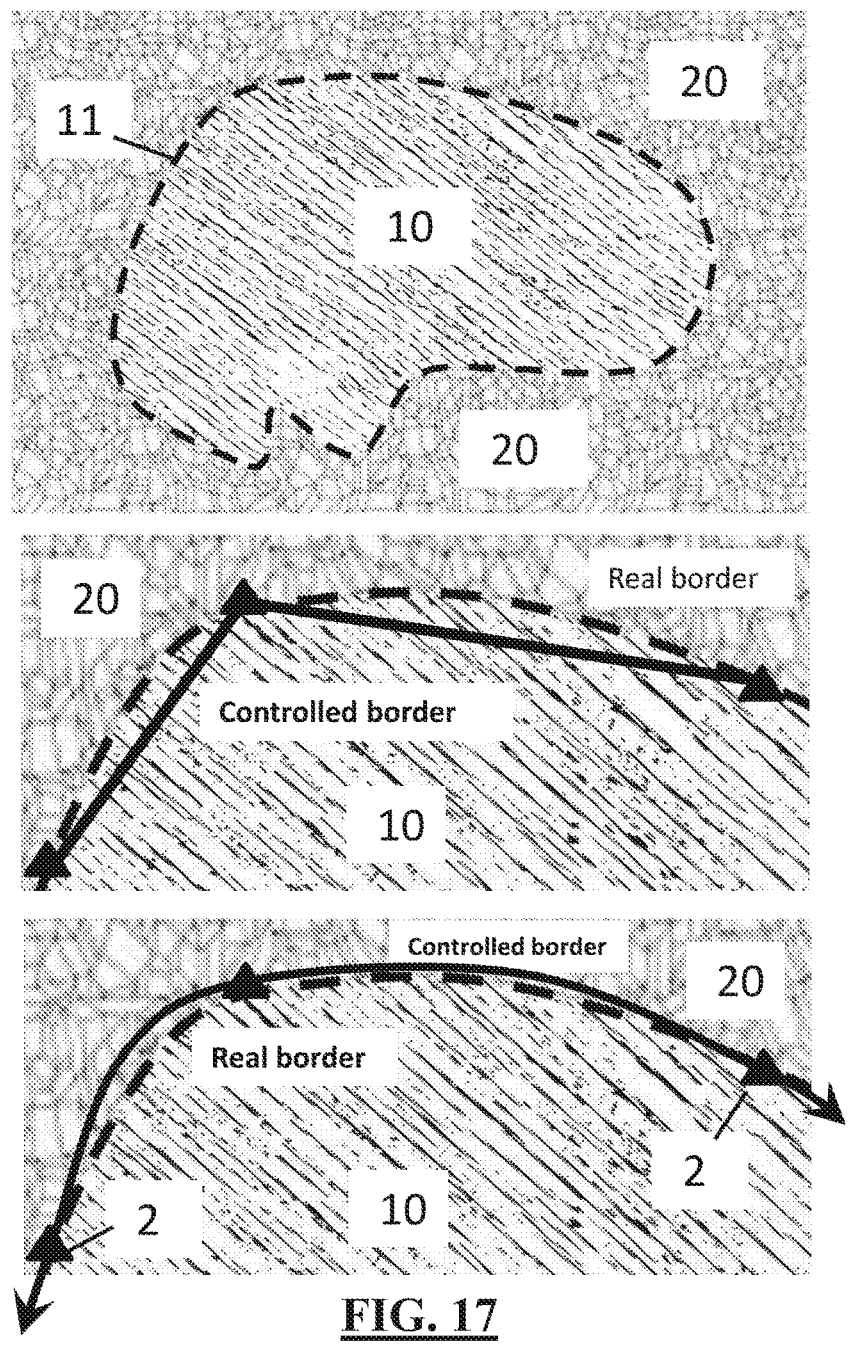
FIG. 17 illustrates that the robot defines the border lines to separate the inside and the outside of the working region.

In one embodiment, as shown in FIG. 17, the inside of the working region 10 and the outside of the working region 20 may have similar features such that the camera's imaging system may be not able to distinguish the differences. The indistinguishable causes may be due to the conditions of the regions, or the selection of the working region, or the placement of the boundary posts 2 by the users. In one embodiment, while the camera's imaging system may be not able to distinguish the differences in between the inside region 10 and outside region 20, the boundary post system, which is using RF and ultrasonic devices on the robot and on the boundary posts 2, controls the moving of the robot. In FIG. 17, the dash lines are the real border line 11, and the solid lines indicate the possible definition of the border lines from the users, for example, the straight line connecting the boundary post 2, a polyline connecting the boundary posts 2, and so on. The solid lines are the controlled border lines from the users to guide the moving of the robot, and the controlled lines may be determined with a software procedure. In one embodiment, the robot may use the specific boundary posts 2 to determine a moving route. The robot may use the local distance data, which is referred to the distances to the local boundary posts 2, to determine the moving directions and distances.

Figure 18A:
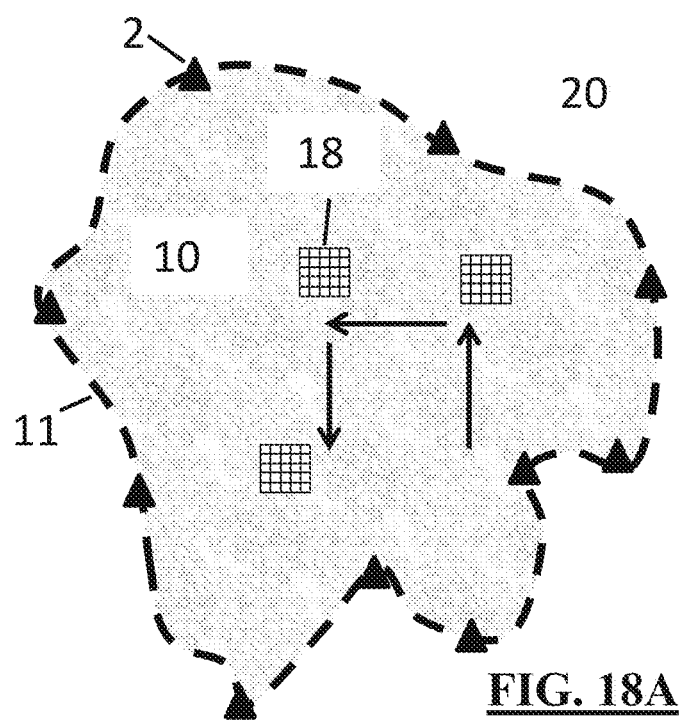
FIGS. 18A-18B illustrate the robot learns and records the image and video data to guide its own moving.
Figure 18B:
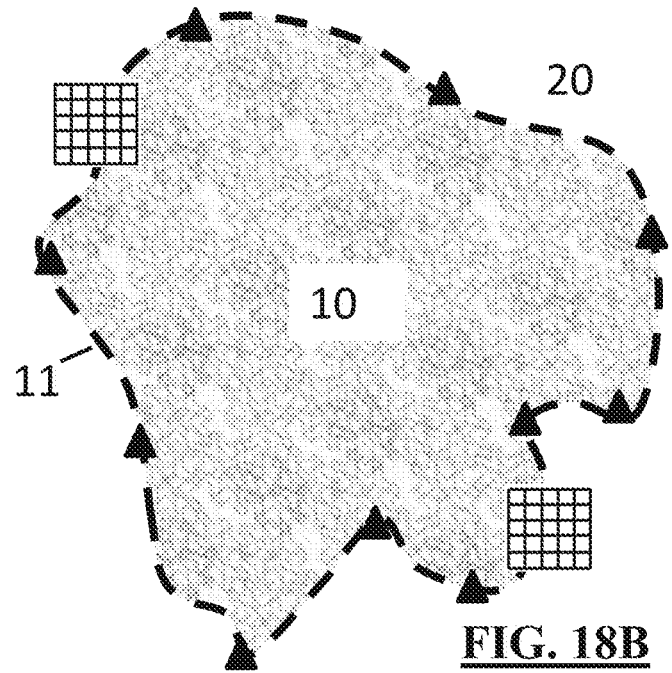

In one embodiment, as shown in FIGS. 18A and 18B, as robot travels from one place to another place, the robot may analyze the data of camera's image or video, and use the data to guide the moving of the robot. The robot may be initially inside the working region 10 and may travel in predetermined directions and distances to collect the data of images and videos. These camera's images or videos include the features of the inside region 10 such that the robot may use the data to detect if robot travels near an outside region 20 which has different features. The robot may be initially at the borderline 11 to collect the data of images or videos from both inside and outside regions, such that the robot defines and differentiates the features of inside and outside regions. In one embodiment, the robot may learn and record the data of images and videos, or the features of inside and outside regions, to guide its own moving. The features include color, pattern, geometry, contour, image appearance, image pixels, image histogram, light reflectivity, light intensity, morphology, temperature, structure, configuration, emission, shape, characteristic, wavelength, and so on. The robot may learn more as it travels more, such that, it learns from its own experience to guide its own moving. In one embodiment, instead of using the taken images or videos from the robot, users may provide the image and video data to the robot and command the robot to use data to differentiate the inside 10 and outside 20 working regions. Depending on the conditions of inside and out working regions, the users may provide appropriate data to the robot to define the preferred borderline 11. In this regard, the borderline 11 may be flexibly defined by the users.

Figure 19A:
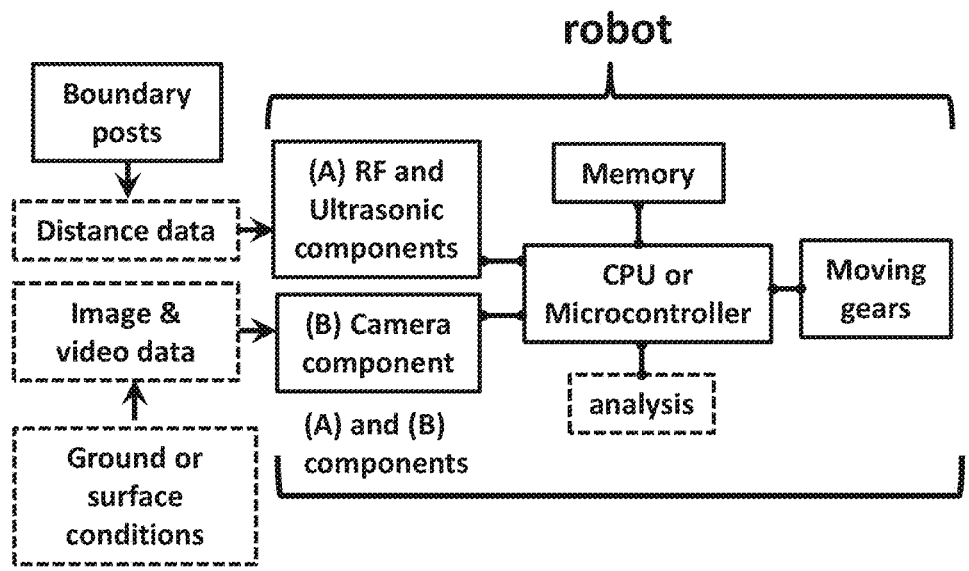
FIGS. 19A-19B illustrate the components of the system.
Figure 19B:
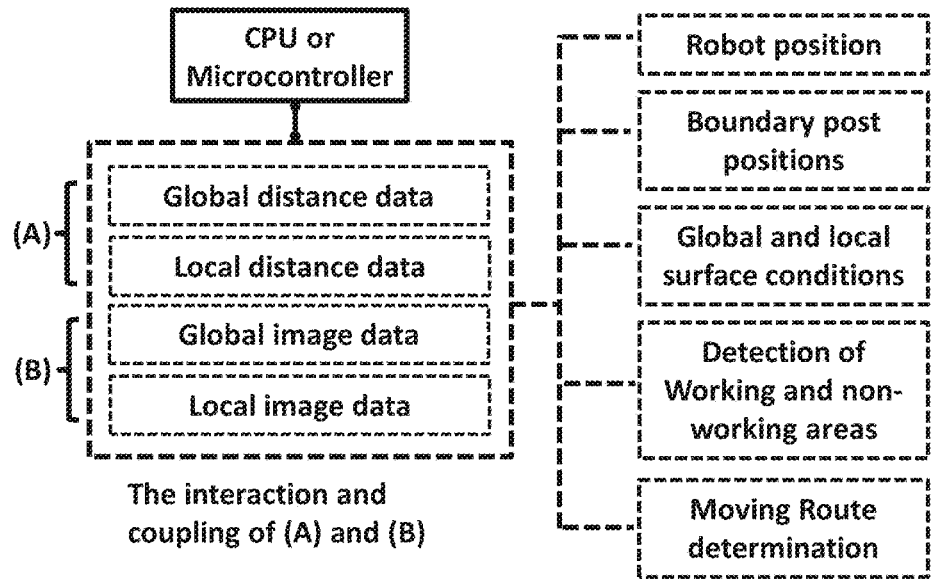

FIG. 19A illustrates a block diagram of the components used in the system, which includes boundary posts 2, RF and ultrasonic components, camera component, CPU or microcontroller, memory device, and moving gears. The coupling of boundary posts 2 with the RF and ultrasonic devices determines the distances and positions of these devices, or the distance data. The camera on the robot receives image data from the ground or surface. The CPU or microcontroller on the robot analyzes these two groups of data to determine the moving direction and distance of the robot. FIG. 19B further illustrates the data may be categorized into different four groups, which are global distance data, local distance data, global image data, and local image data. The global distance data refers to the using of a plurality of boundary posts to determine the positions of the robot and the boundary posts, and with this group of data, the position of the robot, with respect to boundary posts 2, is determined. The local distance data refers to the using of a small group of boundary posts 2, especially when the robot is near the border line 11, as shown and explained in FIG. 17, to determine a moving direction and distance. The global image data refers to the using of image data from a large region to differentiate working and non-working areas, as explained and shown in FIG. 15. The local image data refers to the using of image data from a local area, as explain and shown in previous FIGS. 11 to 14, such that the robot determines a moving route according to the image data. With the using of these four groups of data, the CPU or microcontroller of the robot determines the position of the robot and the positions of the boundary posts 2, differentiates the working and non-working regions, and determines a moving route.

In one embodiment, for an indoor floor cleaning robot, the working region is the indoor floor, and the working region is confined by the house walls. For a pool cleaning robot, the pool is the working region. For a robotic lawn mower, the working region is the lawn area, and outside of the lawn is the non-working region. In one embodiment, user may place a plurality of boundary posts 2 at their preferred positions to enclose a specific area to define a working region.

Figure 20:
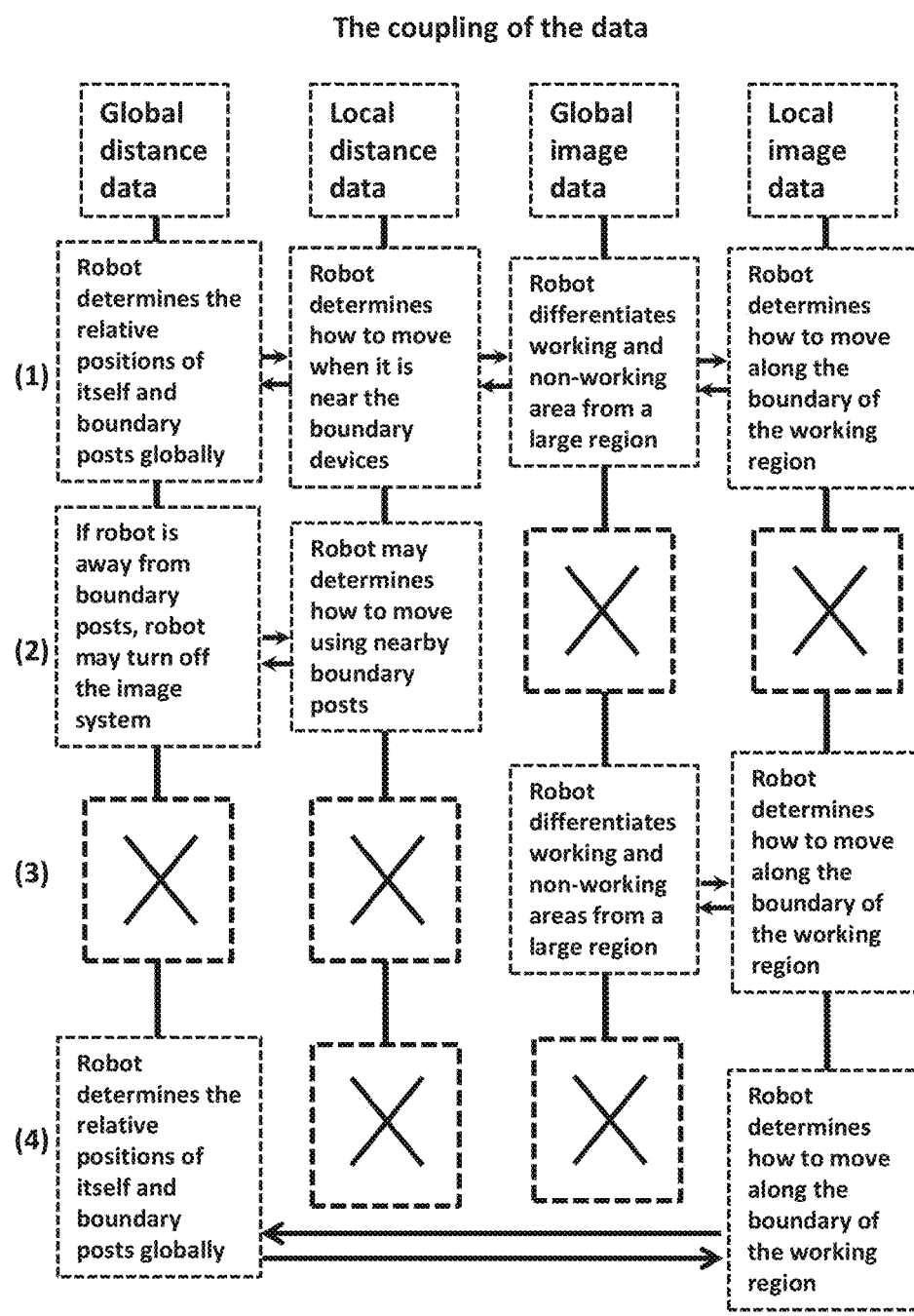
FIG. 20 illustrates the coupling of the distance data and image data to guide the moving of the robot.

FIG. 20 illustrates that the robot may use four groups of data to determine its moving route. Each group of data may be used separately and independently, as shown in the figure the straight lines from top to bottom. In one embodiment, if the collection and the analyses of the data are not an issue for the CPU on the robot, four groups of data may be used altogether, as shown the first scenario. The data of the groups may couple with each other as shown the arrows in the figure connecting to the left and to the right. Robot may use one or more than one group of data to determine its moving direction and moving distance. In one embodiment, robot may use only the global and local distance data to determine its moving route, as shown the second scenario in the figure. For a robot travels in the middle of the working area and travels away from the boundary devices, the robot may not need to use the camera's image data. Similarly, the robot may use only the global and local image data to determine its moving route as shown the third scenario in the figure. In real applications, the image data usually consumes more CPU resources thus using only image data to determine a moving route may be not efficient and economic. In one embodiment, robot may couple the global distance data and local image data to determine its moving route, as shown the fourth scenario in FIG. 20. With this scenario, robot determines its position inside the working region 10 with a global distance data, and while robot travels near the border of the working area, robot uses the local image data to determine its moving. The scenario avoids the using of excessive number of boundary posts 2, and at the same time, achieves a well-controlled moving when robot is near the border of the working region 10. In one embodiment, robot may use any combination of the groups of the data to guide its mowing, and the combination is not limited to the shown four scenarios.

Figure 21:
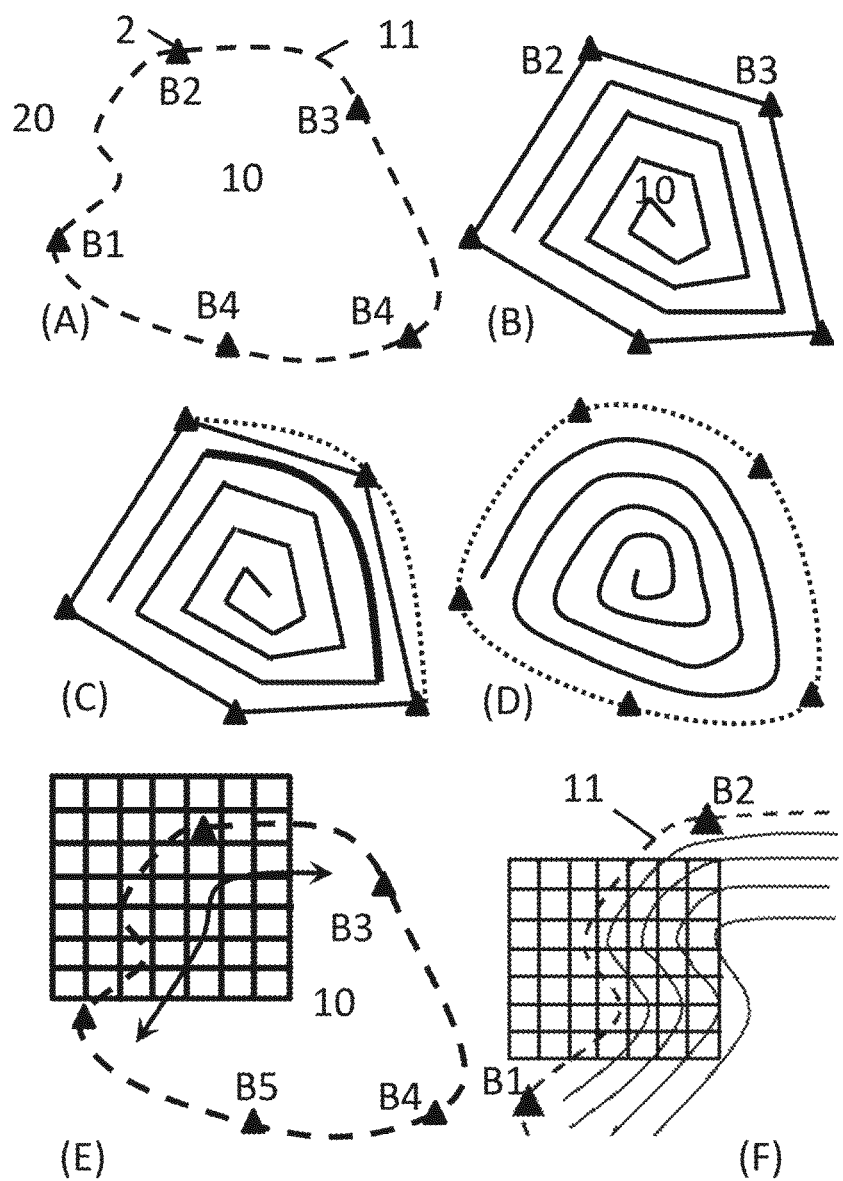
FIG. 21 illustrates the coupling of the distance data and image data to guide the moving of the robot.

FIG. 21A illustrates one example of using four groups of data to determine a robot's moving route, with five boundary posts 2 placed along the border line 11 and the working region 10 is enclosed by the border line 11. FIG. 21B illustrates, with global distance data, the positions of the robot and boundary posts 2 are determined, and the virtual connection of the boundary posts 2 also encloses a working region 10, such that the robot may define a traveling route as shown the solid lines inside. However, the polygon-shape working region 10 enclosed by the boundary posts is different from the real working region, such that the traveling route may be not able to capture the curves of the border line 11, especially the curvy border line 11 in between boundary posts B1 and B2, because global distance data recognizes only the boundary posts 2, not the curve border line 11. With the situation, robot may miss a portion of working region and may travel outside of the working region. In one embodiment, as shown in FIG. 21C and FIG. 21D, robot may use nearby boundary posts 2, for example a curve fitting method, to better capture the geometry of the border line 11, and to define a better robot's moving route along the curve border line 11. With more of boundary posts 2 used, the geometry of the border line 11 may be better captured, though with the disadvantage of excessive number of boundary posts 2 being used. In one embodiment, as the geometry of the working region 10 becomes very complex or irregular, the camera's image system may be better to differentiate the working and the non-working regions near the border lines 11. FIGS. 21E and 21F illustrate the coupling of the global and local image data, respectively, to differentiate the working 10 and the non-working regions 20, and to define a moving route. FIG. 21F illustrates that as robot travels near the boundary posts B1 and B2, the local image data captures the curve of the border line 11, such that the robot is advised to travel along the curve of the border line 11. The curve solid lines show the possible traveling routes to comply with the curvy border lines 11 in between boundary posts B1 and B2.

Figure 15:
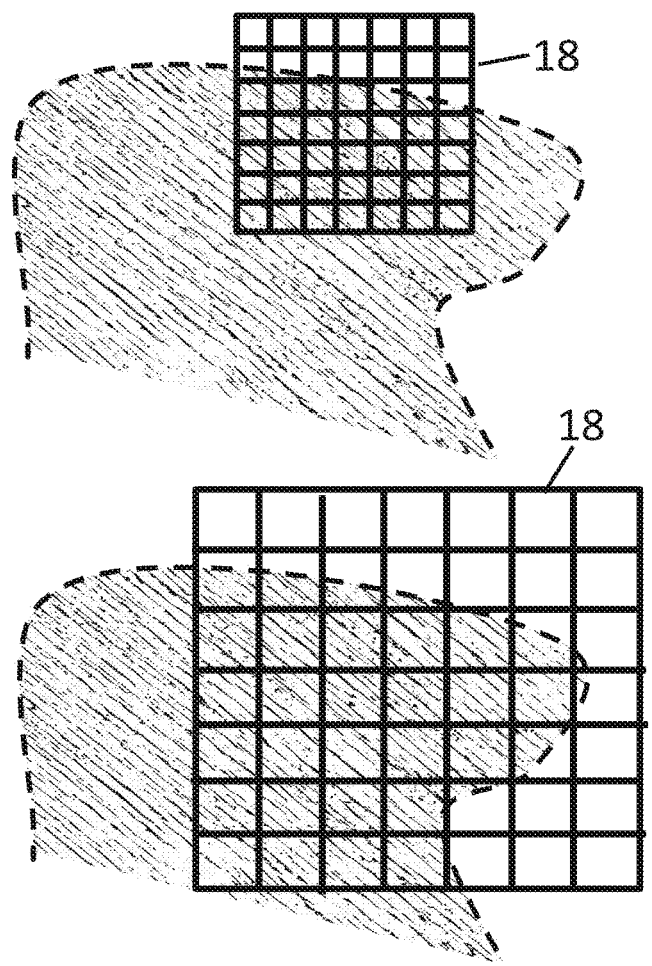
FIG. 15 illustrates the camera's imaging system to differentiate the inside and the outside of the working region.

As mentioned in previous FIG. 15, the local image data refers to that camera pointing to local surface areas to capture the local images which are near the robot, while global image data refers to that camera pointing to bigger surface areas, which may be near or not near the robot, to capture the images of bigger surface areas. Both local image data and global image data may be used to determine the robot is inside or outside the working region 10 and to determine a moving route. However, in real application, the processing of the image data may be very time consuming and CPU intensive, especially for the global image data. In this regard, the efficiency and resource of CPU or microcontroller must be carefully considered in the implementation of camera's imaging system to define a moving route.

In one embodiment, the coupling of global distance data and local image data may be an economical approach. The global distance data defines the relative positions of robot and boundary posts 2. The local image data differentiates the working region and non-working region and advises the robot to move along the curved border line 11. In one embodiment, the local distance data and global image data may be not used if there is a need to save CPU's computational resources. In one embodiment, other than polygon-shape route, various shapes of moving routes may be used.

Figure 22A:
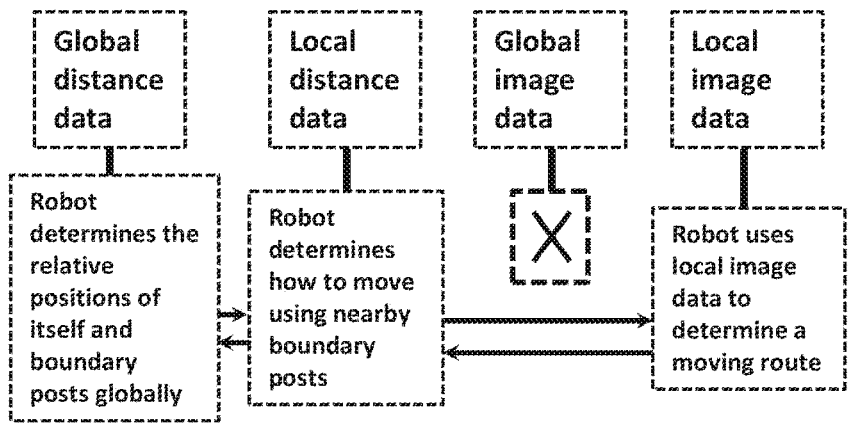
FIGS. 22A-22B illustrate one example of data flow used to control the moving of the robot.
Figure 22B:
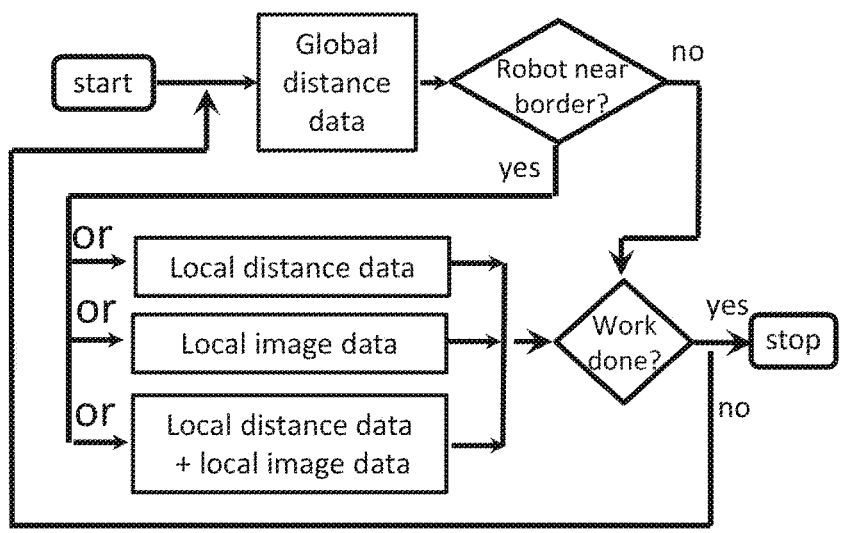

FIG. 22A illustrates one example of using global distance data, local distance data, and local image data to control the moving of the robot. Firstly, the global distance data determines the positions of the robot and boundary posts 2, and determines if the robot is near the border of the working region 10. When the robot is near the border of the working region 10, robot may use one group of data, as shown in FIG. 22B, to determine its moving route. In the figure, three groups of data flow, local distance data, local image data, or combination of local distance data and local image data, may be used to control the moving of the robot. With the data flow, the CPU's intensive imaging processing may be minimized or avoided, so as to save CPU's computational resource and electricity. For a practical implementation of the data flow, when robot is away from the border of the working region 10, robot may use only the global distance data to determine its moving, and robot may turn off the camera system. The robot may turn on its camera and activate the local image processing system to collect local image data, for example, only when the robot is within 3 feet to the border of the working region 10. In one embodiment, the robot may adjust and define the length in between robot and boundary posts 2 to turn on or off the camera system. In one embodiment, when the robot is near the border of the working region 10, the local image data helps preventing the robot from traveling to outside, even there is no boundary post 2 there. The detailed methodologies of using local image data to prevent robot from traveling to outside region and to move along the border are explained in previous FIGS. 11 to 14.

Figure 23A:
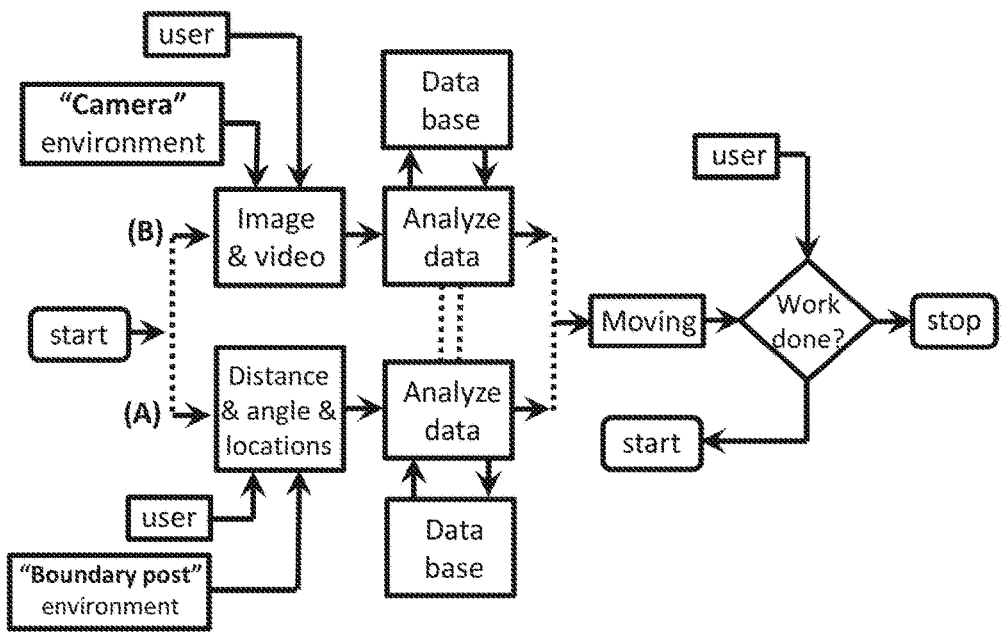
FIGS. 23A-23B illustrate the software algorithm to guide the moving of the robot.
Figure 23B:
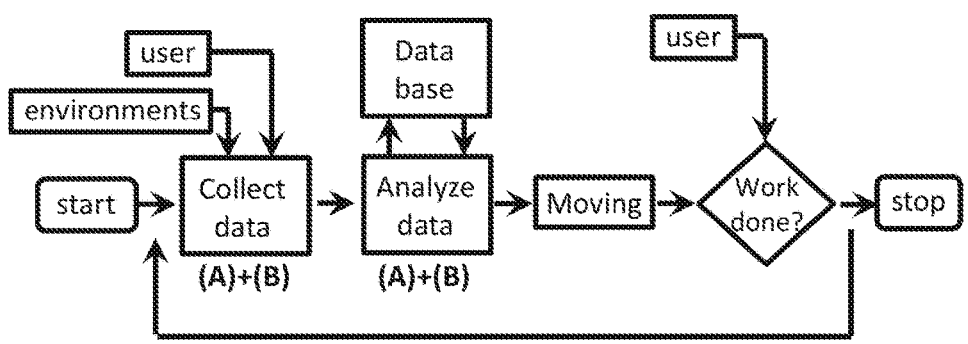

FIGS. 23A and 23B illustrate the software algorithm of the mapping and tracking system of the robot. The robot may use either the camera system or the boundary post system, or the coupling of both systems. The dash lines of the figure refer to that the robot may go with either one or both. For the robot going with boundary post system, as shown (A) in the figure, the relative distances and angles in between the robot and boundary posts 2 are measured, and the data is stored on a memory device. The users may select how many boundary posts 2 to be used and may place boundary posts 2 at appropriate locations to capture the geometry of the working region 10. After the first set of data, the robot may move to next position. If the work is not done, the robot will repeat the collection of the data and the moving. The robot may use several sets of data, or data base, stored on a memory device, to determine its relative distances, angles, positions to the boundary posts 2, and to determine its moving route. In one embodiment, users may define the work scope of the robot, for example, robot may need to cover entire working region 10 or only partial working region 10. With the boundary post system, the robot's position is tracked, and the working region 10 is defined and mapped.

The robot may also use the camera system, as shown (B) in the figure, to determine its moving direction and distance. The robot may take the image and video from the environment, or user may provide the images and videos to the robot, to differentiate the inside and outside of the working regions. With the analyses of images and videos, robot determines its moving route. The moving of the robot and the analysis of the image data keep repeating if the work is not done.

The camera system and boundary post system may be working independently from each other. Robot may use either system to determine a moving route. Each system has its own advantages, depending on the positions of the robot and boundary posts 2, and the conditions of the working region. In one embodiment, the two systems may be coupled together, as shown in FIG. 23B, to do the tracking of the robot and the mapping of the working region 10, and to determine a moving route.

What is claimed is:
1. A robotic mapping and tracking system, comprising:
a robot including an ultrasonic transmitter, a processor and a camera component; and a plurality of boundary posts configured to be placed adjacent to a boundary of a working region, each boundary post of said plurality of boundary posts including an ultrasonic receiver;

wherein said ultrasonic transmitter of said robot broadcasts ultrasonic waves and said ultrasonic receivers of said boundary posts receive said ultrasonic waves, and time-of-flights of said ultrasonic waves are measured to identify distances in between said robot and said boundary posts, wherein said robot moves first predetermined length in first predetermined direction to first position to broadcast first ultrasonic wave to collect first set of relative distances in between said robot and said boundary posts, and said robot moves second predetermined length in second predetermined direction to second position to broadcast second ultrasonic wave to collect second set of relative distances in between said robot and said boundary posts, such that said robot, with the continuous moving and the collection of said relative distances, determines its relative position with respect to said boundary posts, wherein said camera component of said robot captures an image of an environment of said robot, said processor of said robot analyzes said image of said environment and identifies at least a portion of said working region in front of said robot from said image.

2. The robotic mapping and tracking system of claim 1, wherein said processor of said robot analyzes said image of said environment and identifies a non-working region in front of said robot from said image, and said processor of said robot determines said moving route to avoid said non-working region.

3. The robotic mapping and tracking system of claim 1, wherein said camera component of said robot captures a video of said environment of said robot, and said image is a frame of said video.

4. The robotic mapping and tracking system of claim 1, wherein said processor of said robot analyzes said image of said environment and identifies a geometry of at least a portion of said working region in front of said robot from said image.

5. The robotic mapping and tracking system of claim 1, wherein said robot further includes an RF transceiver, each boundary post of said plurality of boundary posts further includes an RF transceiver, said RF transceiver of said robot transmits RF signals received by said RF transceivers of said boundary posts to synchronize and calibrate time clocks of said boundary posts.

6. The robotic mapping and tracking system of claim 1, wherein said robot further includes an RF transceiver, each boundary post of said plurality of boundary posts further includes an RF transceiver, said RF transceiver of said robot receives distance data from said RF transceivers of said boundary posts.

7. The robotic mapping and tracking system of claim 1, wherein each boundary post of said plurality of boundary posts does not store location coordinates of said boundary post.

8. The robotic mapping and tracking system of claim 1, wherein said robot is a robotic lawn mower, a robotic vacuum cleaner, or a robotic pool cleaner.

9. The robotic mapping and tracking system of claim 1, wherein said plurality of boundary posts, comprising:

boundary posts located at an outer border of said working region to confine said robot from traveling outside of said working region, boundary posts located at an interior of said working region to guide movement of said robot, and boundary posts located along borders of objects located in said lawn to prevent said robotic lawn mower from moving across.

10. The robotic mapping and tracking system of claim 1, wherein said ultrasonic receivers of said boundary posts form a distributed array of ultrasonic receivers to determine directions and angles of incoming ultrasonic waves emitted from said robot.

11. The robotic mapping and tracking system of claim 1, wherein said processor runs a coupled algorithm to determine said moving of said robot using either identified distances in between said robot and said boundary posts or images captured by said camera component, or both.

12. The robotic mapping and tracking system of claim 1, wherein a boundary line sensor is built on said robot to reduce said number of boundary posts, wherein said boundary line sensor is any of a group of sensors comprising: a light sensor, a color sensor, a distance sensor, a pressure or a force sensor, a sound sensor, or an image sensor, and wherein said boundary line sensor may be placed at the bottom, at the side, or at the top of said robot.

13. The robotic mapping and tracking system of claim 12, wherein said boundary line sensor may be an active or a passive device, wherein an active device sends out a signal and waits for a reflected signal, while a passive device does not send out a signal and it only waits for an incoming signal from said environment.

14. The robotic mapping and tracking system of claim 12, wherein said robot with a boundary line sensor also has an odometer, and wherein said robot uses said boundary line sensor to travel along said border of said working region, and use said odometer to record traveling directions and lengths.

15. The robotic mapping and tracking system of claim 12, wherein said boundary line sensor may be a camera pointing to a certain part of said working region, and wherein said camera on said robot takes said images or videos of said part of said working region continuously, and analyzes and converts said images or videos into usable data to guide the moving of said robot.

16. The robotic mapping and tracking system of claim 15, wherein said inside and outside working regions are separated with contour lines, and said camera identifies said contour lines, and wherein said robot travels along said contour lines.

17. The robotic mapping and tracking system of claim 15, wherein each picture frame may be further divided into smaller image boxes with a software procedure, wherein each image box collects its local images or videos at its local position, and wherein more image boxes refer to more and smaller images or videos, or more data points, capturing physical behaviors from said images or videos at said smaller areas.

18. A robotic mapping and tracking system, comprising:

a robot including an ultrasonic transmitter, a processor and a camera system; and a plurality of boundary posts configured to be placed adjacent to a boundary of a working region, each of said plurality of boundary posts including an ultrasonic receiver;

wherein said ultrasonic transmitter of said robot broadcast ultrasonic waves and said ultrasonic receivers of said boundary posts receive said ultrasonic waves, and time-of-flights of said ultrasonic waves are measured to identify distance data between said robot and said boundary posts and said distance data is sent to said processor;

wherein said camera system captures images and use an image processing system to generate image data and send image data to said processor;

wherein said distance data and said image data are categorized into four data groups, said four data groups comprising global distance data, local distance data, global image data, and local image data;

wherein said global distance data refers to using of said plurality of boundary posts to determine positions of said robot with respect to said boundary posts, and with this group of data, said position of said robot, with respect to boundary posts, is determined, wherein said local distance data refers to using of a small group from said plurality of boundary posts, especially when said robot is near a border line to determine said robot's moving direction and distance, wherein said global image data refers to using of image data from a large region to differentiate working and non-working areas, wherein said local image data refers to using of image data from a local area, such that said robot determines a moving route according to said image data, and wherein using of one or more groups of data from said four data groups, said processor of said robot determines said position of said robot with respect to said boundary posts, differentiates said working and non-working regions, and determines said moving route.

19. The robotic mapping and tracking system of claim 18, wherein four groups of data are used altogether when said processor of said robot has enough processing power for collecting and analyzing of said four groups of data.

20. The robotic mapping and tracking system of claim 18, wherein said robot couples said global distance data and said local image data to determine its moving route, and wherein said robot determines its position inside said working region with said global distance data, and while said robot travels near said border of said working area, said robot uses said local image data to determine its moving.

21. The robotic mapping and tracking system of claim 18, wherein said robot uses said global distance data, said local distance data and said local image data to determine its moving route, wherein, firstly, said global distance data determines said positions of said robot with respect to said boundary posts, and determines if said robot is near said border of said working region;

wherein, when said robot is near said border of said working region, said robot uses one group of data, to determine its moving route, wherein said group of data comprise said local distance data, said local image data, or combination of said local distance data and said local image data, said group of data are used to control said moving of said robot, and wherein said processor's intensive imaging processing is minimized or avoided, so as to save said processor's computational resource and electricity.

22. The robotic mapping and tracking system of claim 21, wherein, when said robot is away from said border of said working region, said robot uses only said global distance data to determine its moving, and said robot turns off said camera system.

23. The robotic mapping and tracking system of claim 22, wherein said robot turns on its camera and activate said local image processing system to collect said local image data when said robot is within a configurable distance to said border of said working region.

24. The robotic mapping and tracking system of claim 18, wherein, said distance data comprise said relative distances and angles between said robot and said boundary posts, and said distances data are stored on a memory device, wherein a user selects how many boundary posts to be used and place boundary posts at appropriate locations to capture a geometry of said working region, wherein, after the first set of data, said robot moves to next position, wherein, if work is not done, said robot repeats collection of next set of distance data and moving to a second next position, and wherein said robot uses several sets of data, or data base, stored on a memory device, to determine its relative distances, angles, positions to said boundary posts, and to determine its moving route.

25. The robotic mapping and tracking system of claim 18, wherein, said robot uses said camera system to determine its moving direction and distance, wherein said robot takes images or videos from said environment, or a user provides images and videos to said robot, to differentiate inside and outside of said working regions, wherein said robot analyzes said images and videos, and determines its moving route, wherein said robot repeat its moving and analyzing of said image data until work is done.

26. The robotic mapping and tracking system of claim 18, wherein said robot further includes an RF transceiver, each boundary post of said plurality of boundary posts further includes an RF transceiver, said RF transceiver of said robot receives said distance data from said RF transceivers of said boundary posts.

27. A robotic mapping and tracking system, comprising:
a robot including an ultrasonic transmitter, a processor and a camera component; and
a plurality of boundary posts configured to be placed adjacent to a boundary of a working region, each boundary post of the plurality of boundary posts including a ultrasonic receiver,
wherein the ultrasonic transmitter of the robot broadcast ultrasonic waves and the ultrasonic receivers of the boundary posts receive the ultrasonic waves, and time-of-flights of the ultrasonic waves are measured to identify distances in between the robot and the boundary posts,
wherein the camera component of the robot captures an image of an environment of the robot, the processor of the robot analyzes the image of the environment and identifies at least a portion of the working region in front of the robot from the image, and the processor of the robot determines a moving route based on the identified portion of the working region in front of the robot and the distances in between the robot and the boundary posts,
wherein a boundary line sensor is built on the robot to reduce the number of boundary posts,
wherein the boundary line sensor is any of a light sensor, a color sensor, a distance sensor, a pressure or a force sensor, a sound sensor, or an image sensor;
wherein the boundary line sensor may be placed at the bottom, at the side, or at the top of the robot, wherein the boundary line sensor may be a camera pointing to a certain working region, wherein the camera on the robot takes the images or videos of the working region continuously, and analyzes and converts the images or videos into usable data to guide the moving of the robot, wherein the camera's focus and picture frame size may be adjusted to capture the local geometry of the working region, and wherein the camera can capture local image data for smaller areas and global image data for large area, wherein the distance data and image data are categorized into different four groups, which are global distance data, local distance data, global image data, and local image data, wherein the global distance data refers to the using of a plurality of boundary posts to determine the positions of the robot and the boundary posts, and with this group of data, the position of the robot, with respect to boundary posts, is determined, wherein the local distance data refers to the using of a small group of boundary posts, especially when the robot is near the border line to determine a moving direction and distance, wherein the global image data refers to the using of image data from a large region to differentiate working and non-working areas, wherein the local image data refers to the using of image data from a local area, such that the robot determines a moving route according to the image data, wherein with the using of these four groups of data, the CPU or microcontroller of the robot determines the position of the robot and the positions of the boundary posts, differentiates the working and non-working regions, and determines a moving route, and wherein the robot couples the boundary post system and the image system together to do the tracking of the robot and the mapping of the working region, and to determine a moving route.

\* \* \* \* \*